(12) United States Patent  
Nishikawa et al.

(10) Patent No.: US 7,508,547 B2  
(45) Date of Patent: Mar. 24, 2009

(54) IMAGE PROCESSING APPARATUS, CONTROL METHOD THEREFOR, AND PROGRAM

(75) Inventors: Eiichi Nishikawa, Kanagawa (JP); Yushi Matsukubo, Kanagawa (JP); Hiroyuki Yaguchi, Kanagawa (JP); Hiroyuki Tsuji, Kanagawa (JP); Shinichi Kato, Kanagawa (JP); Masakazu Kitora, Kanagawa (JP); Kenzou Sekiguchi, Tokyo (JP); Hiroyoshi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 798 days.

(21) Appl. No.: 10/990,434

(22) Filed: Nov. 18, 2004

(65) Prior Publication Data  
US 2005/0111052 A1    May 26, 2005

(30) Foreign Application Priority Data  
Nov. 20, 2003 (JP) ............................. 2003-390750

(51) Int. Cl.  
*H04N 1/40* (2006.01)

(52) U.S. Cl. ..................... 358/2.1; 358/448; 382/218

(58) Field of Classification Search ....... 358/1.15–1.18, 358/1.9, 2.1, 448, 464; 382/217–222  
See application file for complete search history.

(56) References Cited

U.S. PATENT DOCUMENTS

| 5,486,686 A | 1/1996 | Zdybel, Jr. et al. ......... 235/375 |
| 5,579,419 A | 11/1996 | Yaguchi et al. ............. 382/305 |
| 5,933,823 A | 8/1999 | Cullen et al. .................... 707/6 |
| 6,466,329 B1 | 10/2002 | Mukai ....................... 358/1.15 |
| 6,980,670 B1 * | 12/2005 | Hoffman et al. ............ 382/115 |
| 2006/0112332 A1 * | 5/2006 | Kemp et al. ................. 715/530 |

FOREIGN PATENT DOCUMENTS

| GB | 2 313 729 A | 12/1997 |
| JP | 10-143414 A | 5/1998 |

OTHER PUBLICATIONS

D. Doermann "The Indexing and Retrieval of Document Images: A Survey" Computer Vision and Image Understanding, Jun. 1998, vol. 70, No. 3, pp. 287-298.

* cited by examiner

*Primary Examiner*—Thomas D Lee  
*Assistant Examiner*—Stephen M Brinich  
(74) *Attorney, Agent, or Firm*—Fitzpatrick, Cella, Harper & Scinto

(57) ABSTRACT

An electronic file corresponding to a scanned original image is specified on the basis of the original image. If the electronic file corresponding to the original image cannot be specified, the original image is converted into vector data. The vector data is converted into image data. The first image data of the original image is compared with the second image data generated by the second conversion unit. On the basis of the comparison result, the first image data or vector data is selected as the electronic file corresponding to the original image.

16 Claims, 22 Drawing Sheets

F I G. 5

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

INPUT FILE INFORMATION

| TOTAL NUMBER OF BLOCKS | N (=6) |
|---|---|

IMAGE PROCESSING APPARATUS, CONTROL METHOD THEREFOR, AND PROGRAM

FIELD OF THE INVENTION

The present invention relates to an image processing apparatus, control method therefor, and program which perform image processing for an original image obtained by scanning an original.

BACKGROUND OF THE INVENTION

In recent years, amid calls for environmental issues, there has been a rapid progression toward paperless offices. As a technique for promoting paperless operation, there is proposed a document management system which scans paper documents stored in binders and the like with a scanner or the like, converts them into image files such as portable document format (to be referred to as PDF hereinafter), and stores and manages them in an image storage.

In a multifunction apparatus with enhanced functions, in storing and managing an image file corresponding to a paper document, pointer information indicating the location of the image file in an image storage can be recorded on the cover sheet or in the information of the paper document as additional information. In reusing (e.g., copying) the paper document, the storage location of the original electronic file (image file) corresponding to the paper document is detected from the pointer information, and the original electronic file is directly reused. This makes it possible to reduce the total amount of paper documents held and obtain a print with high image quality (e.g., Japanese Patent Laid-Open No. 10-143414).

In the former document management system, a paper document can be saved as a PDF file with a small amount of information. However, a PDF file itself is image information, and thus objects (e.g., a text block, graphic block, table block, and the like) in the PDF file cannot be reused electronically. Some editing operation is required to reuse a certain object in the paper document. More specifically, the necessary object needs to be created again using application software or needs to be extracted from the PDF file.

As for the latter multifunction apparatus, generally, a paper document created in a certain organization can easily be reused in the organization because the original electronic file corresponding to the paper document can directly be accessed. On the other hand, a paper document obtained from outside the organization or a paper document in which the location of a corresponding original electronic file is unknown cannot be reused.

Under the circumstances, if the original electronic file of a paper document cannot be identified in a system, an image (image information) obtained by scanning the paper document is converted into vector data by vectorization and is saved as the original electronic file. With this operation, image information obtained by scanning an arbitrary paper document can be handled as a reusable electronic file.

However, the contents of an image generated using vector data (original electronic file) obtained by the above-mentioned vectorization may greatly be different from the contents of an image (image information) obtained by scanning the original paper document due to erroneous determination or the like, depending on the contents of the vectorization.

For this reason, in reusing the original electronic file corresponding to a paper document, the user cannot perform an intended process depending on the application purpose.

For example, if image information of a paper document comprising a text block is vectorized to generate vector data, the text block undergoes character recognition and is encoded. However, there is no font corresponding to that of the text block on the system side, the text block may be encoded (vectorized) in a different font. In this case, the text block is not vectorized in a font intended by the user.

SUMMARY OF THE INVENTION

The present invention has been made to solve the above-mentioned problems, and has as its object to provide an image processing apparatus, control method therefor, and program which can generate and utilize an electronic file with contents closer to the user's intention as one corresponding to a scanned document image.

According to the present invention, the foregoing object is attained by providing an image processing apparatus which performs image processing for an original image obtained by reading an original, comprising:

a reading unit, adapted to read an original;

a first conversion unit, adapted convert an original image read by the reading unit into vector data;

a second conversion unit, adapted to convert the vector data into image data;

a comparison unit, adapted to compare first image data of the original image with second image data generated by the second conversion unit; and a selection unit, adapted to select the first image data or vector data as an electronic file corresponding to the original image on the basis of a comparison result from the comparison unit.

In a preferred embodiment, the apparatus further comprises a specifying unit, adapted to specify the electronic file corresponding to the original image on the basis of the original image read by the reading unit, wherein the first conversion unit converts the original image into vector data if the specifying unit cannot specify the electronic file corresponding to the original image.

In a preferred embodiment, the selection unit selects the first image as the electronic file corresponding to the original image if the comparison result from the comparison unit shows that the first image data is different from the second image data.

In a preferred embodiment, the selection unit selects the second image as the electronic file corresponding to the original image if the comparison result from the comparison unit shows that a proportion of a difference between the first image data and the second image data is equal to or less than a threshold value.

In a preferred embodiment, the apparatus further comprises:

a presentation unit, adapted to present the first image data and second image data on a display as the comparison result from the comparison unit; and a designation unit, adapted to designate either of the first image data and the second image data presented on the display, wherein the selection unit selects the first image data or second image data designated by the designation unit as the electronic file corresponding to the original image.

In a preferred embodiment, if the electronic file specified by the specifying unit is image data, the first conversion unit converts the image data into vector data.

In a preferred embodiment, the specifying unit comprises recognition unit, adapted to recognize pointer information appended to an original image and indicating a storage destination of an electronic file corresponding to the original image and specifies the electronic file corresponding to the original image on the basis of the pointer information recognized by the recognition unit.

In a preferred embodiment, the apparatus further comprises:

a search unit, adapted to, if the specifying unit cannot specify the electronic file corresponding to the original image, and the recognition unit cannot recognize the pointer information, search for the electronic file corresponding to the original image in a storage;

an output unit, adapted to output electronic files found by the search unit as candidates for the electronic file corresponding to the original image; and a selection unit, adapted to select a desired electronic file from the candidates for the electronic file, wherein if the electronic file selected by the selection unit is image data, the first conversion unit converts the image data into vector data.

In a preferred embodiment, the apparatus further comprises division unit, adapted to divide the original image for each attribute into a plurality of blocks, wherein the first conversion unit converts each of the blocks of the original image obtained by the division unit into vector data.

In a preferred embodiment, the second conversion unit converts the vector data generated by the first conversion unit for the each block into image data for the block.

In a preferred embodiment, the comparison unit compares first image data for each of the blocks of the original image obtained by the division unit with second image data generated for the block by the second conversion unit.

In a preferred embodiment, the apparatus further comprises data conversion unit, adapted to convert the vector data into data in a predetermined format processable by a word processing application which can operate on a terminal.

In a preferred embodiment, the apparatus further comprises:

a storage unit, adapted to store the first image data or vector data selected by the selection unit in a predetermined storage as the electronic file corresponding to the original image; and an appending unit, adapted to generate pointer information indicating a storage destination of the electronic file and appending the pointer information to the electronic file.

In a preferred embodiment, the apparatus further comprises:

a division unit, adapted to divide the original image for each attribute into a plurality of blocks; and a search unit, adapted to, if the specifying unit cannot specify the electronic file corresponding to the original image, search for vector data corresponding to each of the blocks obtained by the division unit in a storage, wherein the first conversion unit converts the original image into vector data using vector data found by the search unit.

In a preferred embodiment, the apparatus further comprises:

a division unit, adapted to divide the original image for each attribute into a plurality of blocks; and a control unit, adapted to execute the first conversion unit, second conversion unit, comparison unit, and selection unit for each of the blocks obtained by the division unit.

In a preferred embodiment, the apparatus further comprises:

a division unit, adapted to divide the original image for each attribute into a plurality of blocks; and a control unit, adapted to execute the first conversion unit, second conversion unit, comparison unit, and selection unit depending on a type of each of the blocks obtained by the division unit.

According to the present invention, the foregoing object is attained by providing a control method for an image processing apparatus which performs image processing for an original image obtained by reading an original, comprising:

a read step of reading an original;

a first conversion step of converting an original image read in the read step into vector data;

a second conversion step of converting the vector data into image data;

a comparison step of comparing first image data of the original image with second image data generated in the second conversion step; and a selection step of selecting the first image data or vector data as an electronic file corresponding to the original image on the basis of a comparison result from the comparison step.

According to the present invention, the foregoing object is attained by providing a program for implementing control of an image processing apparatus which performs image processing for an original image obtained by reading an original, comprising program codes of:

a read step of reading an original;

a first conversion step of converting an original image read in the read step into vector data;

a second conversion step of converting the vector data into image data;

a comparison step of comparing first image data of the original image with second image data generated in the second conversion step; and a selection step of selecting the first image data or vector data as an electronic file corresponding to the original image on the basis of a comparison result from the comparison step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a view showing an example of block information according to the first embodiment of the present invention;

DETAILED DESCRIPTION OF THE PREFERRED EMBODIMENTS

Preferred embodiments of the present invention will be described in accordance with the accompanying drawings.

First Embodiment

Figure 1:
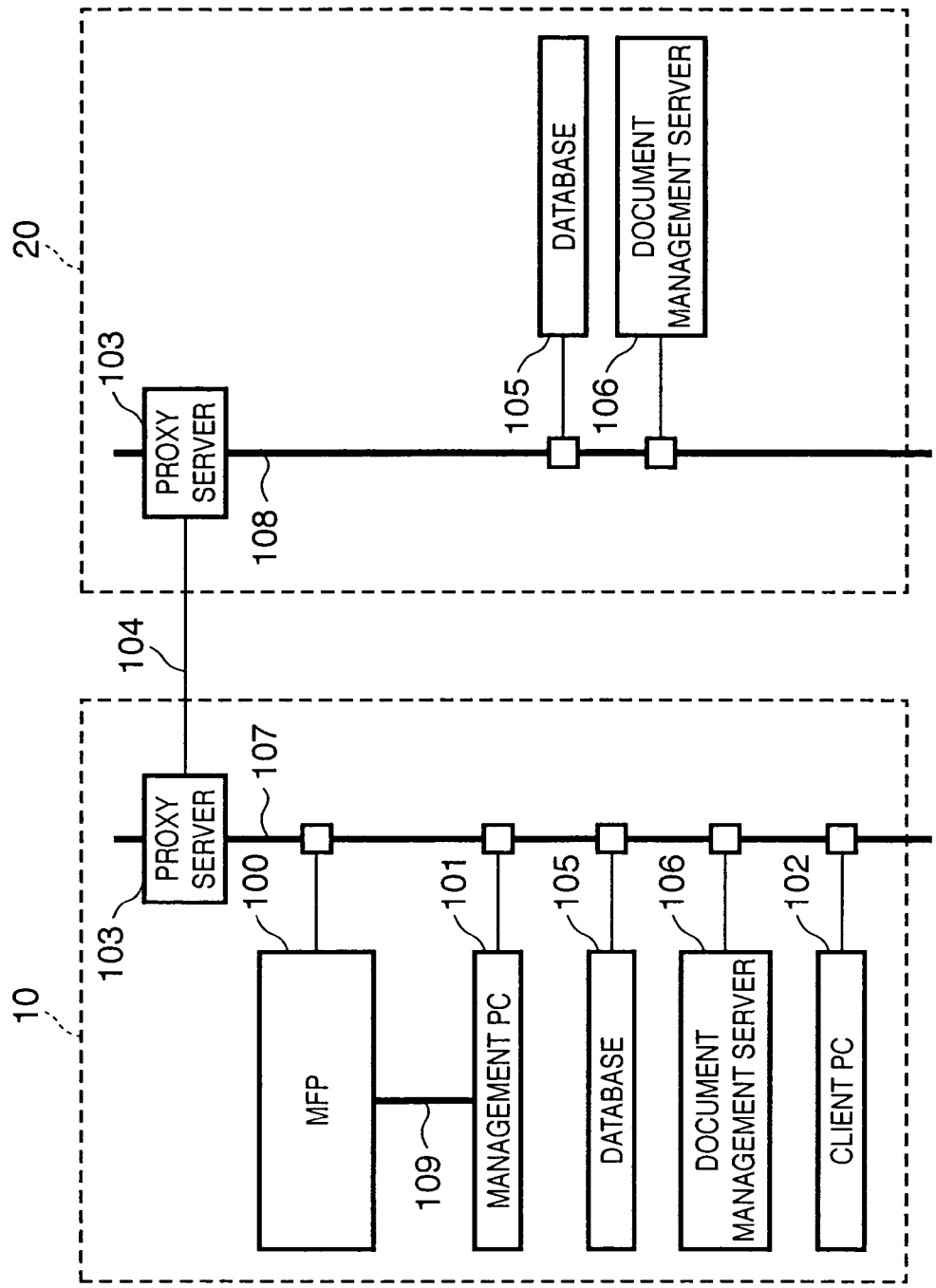
FIG. 1 is a block diagram showing the arrangement of an image processing system according to the first embodiment of the present invention.

FIG. 1 is a block diagram showing the arrangement of an image processing system according to the first embodiment of the present invention.

The image processing system is implemented in an environment where offices 10 and 20 are connected by a network 104 such as the Internet.

A LAN 107 constructed in the office 10 is connected to an MFP (Multi Function Peripheral) 100 serving as a multifunction apparatus which realizes a plurality of types of functions (copying function, printing function, transmitting function, and the like), a management PC 101 which controls the MFP 100, a client PC 102 which utilizes the MFP 100, a document management server 106, a database 105 for the server 106, and a proxy server 103.

A LAN 108 constructed in the office 20 is connected to the proxy server 103, the document management server 106, and the database 105 for the server 106.

The LAN 107 in the office 10 and the LAN 108 in the office 20 are connected to the network 104 via the proxy servers 103 of the two offices.

The MFP 100 comprises an image reader which electronically reads particularly a paper document, and an image processor which executes image processing for an image signal obtained from the image reader. The image signal can be transmitted to the management PC 101 via a LAN 109.

The management PC 101 is a general PC (personal computer), and incorporates various components such as an image storage unit, image processor, display, and input unit. Some of the components are integrated into the MFP 100.

Note that the arrangement in FIG. 1 is merely an example. The office 20 with the document management server 106 may be omitted, a plurality of offices 20 may be provided, or the offices 10 and 20 may be connected to each other on the single LAN.

The network 104 is a so-called communication network which is typically realized by one or a combination of the Internet, LAN, WAN, telephone line, dedicated digital circuit, ATM, frame relay line, communication satellite channel, cable television line, data broadcasting radio channel, and the like as far as the network enables data exchange.

Various terminals such as the management PC 101, client PC 102, and document management server 106 each have components (e.g., a CPU, RAM, ROM, hard disk, external storage, network interface, display, keyboard, and mouse) which are standard equipment for a general-purpose computer.

The detailed arrangement of the MFP 100 will be explained with reference to FIG. 2.

Figure 2:
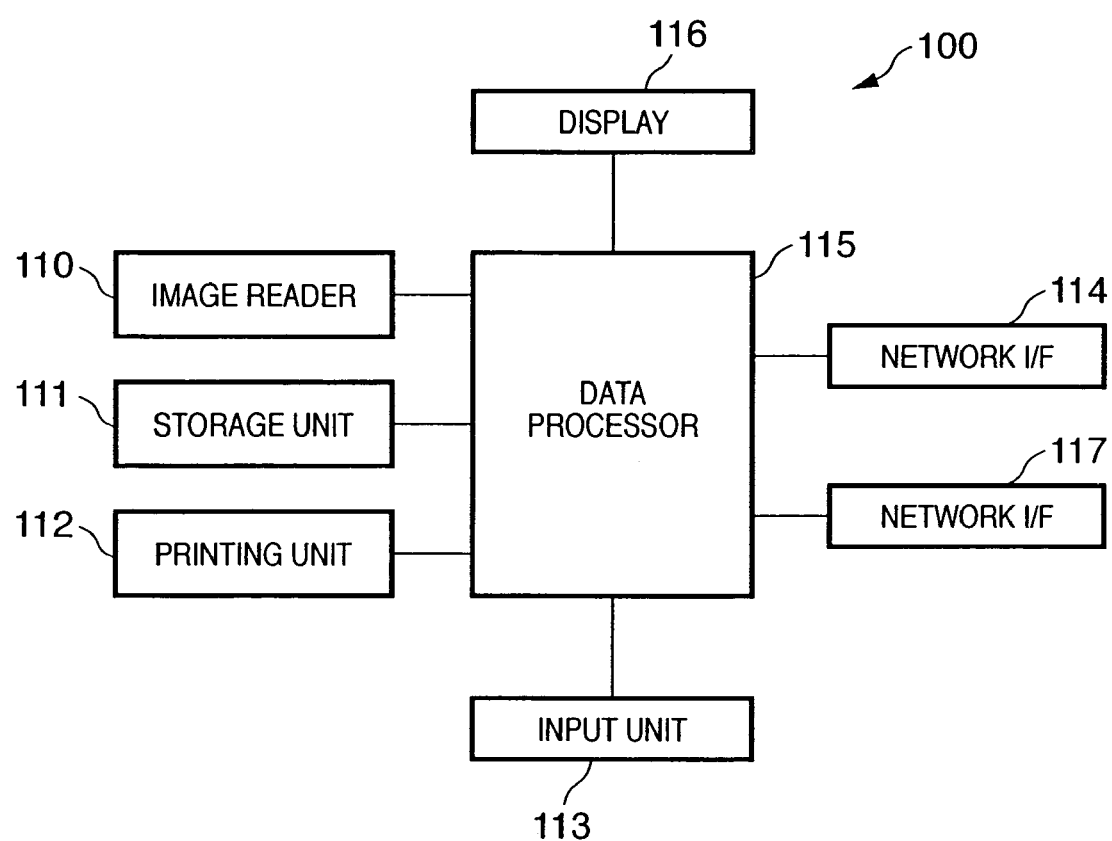
FIG. 2 is a block diagram showing the detailed arrangement of an MFP according to the first embodiment of the present invention.

FIG. 2 is a block diagram showing the detailed arrangement of the MFP according to the first embodiment of the present invention.

In FIG. 2, an image reader 110 including an auto document feeder (ADF) irradiates a bundle or one of document images with a light source (not shown), forms a reflected document image on a solid-state image sensing element via a lens, and obtains a raster image reading signal from the solid-state image sensing element as a raster image at a predetermined density (600 dpi or the like).

The MFP 100 has a copying function of printing an image corresponding to an image reading signal on a printing medium by a printing unit 112. To form a copy of a document image, the image reading signal is processed by a data processor 115 to generate a printing signal, and the printing signal is printed on a printing medium by the printing unit 112. To form copies of a document image, a printing signal for one page is temporarily stored and held in a storage unit 111, and such printing signals are sequentially output to the printing unit 112 to print them on printing media.

As for the transmitting function via a network I/F 114, a raster image obtained from the image reader 110 is converted into an image file in a compressed image file format such as TIFF or JPEG or a vector data file format such as PDF and is output from the network I/F 114. The output image file is sent to the document management server 106 or client PC 102 via the LAN 107 or is further sent to the other document management server 106 in the office 20 via the network 104.

As the printing function by the printing unit 112, printing data output from the client PC 102 is received by the data processor 115 via the network I/F 114. The data processor 115 converts the printing data into raster data printable by the printing unit 112, and the printing unit 112 prints the image on a printing medium.

An instruction from the operator to the MFP 100 is input from an input unit 113 formed by a key operation unit attached to the MFP 100 and a keyboard and mouse connected to the management PC 101. A series of operations are controlled by a controller (not shown) in the data processor 115. An operation input state and image data during processing are displayed on a display 116.

The storage unit 111 is also controlled by the management PC 101. Data exchange and control between the MFP 100 and the management PC 101 are performed via a network I/F 117 and the LAN 109.

If the LAN 109 is provided, the data exchange and control between the MFP 100 and the management PC 101 are realized by directly connecting the MFP 100 and management PC 101 via the network I/F 117. Otherwise, these functions are realized via the LAN 107 connected to the network I/F 114.

[Outline of Processing]

The outline of overall processing executed by the image processing system according to the first embodiment will be described with reference to FIG. 3.

Figure 3:
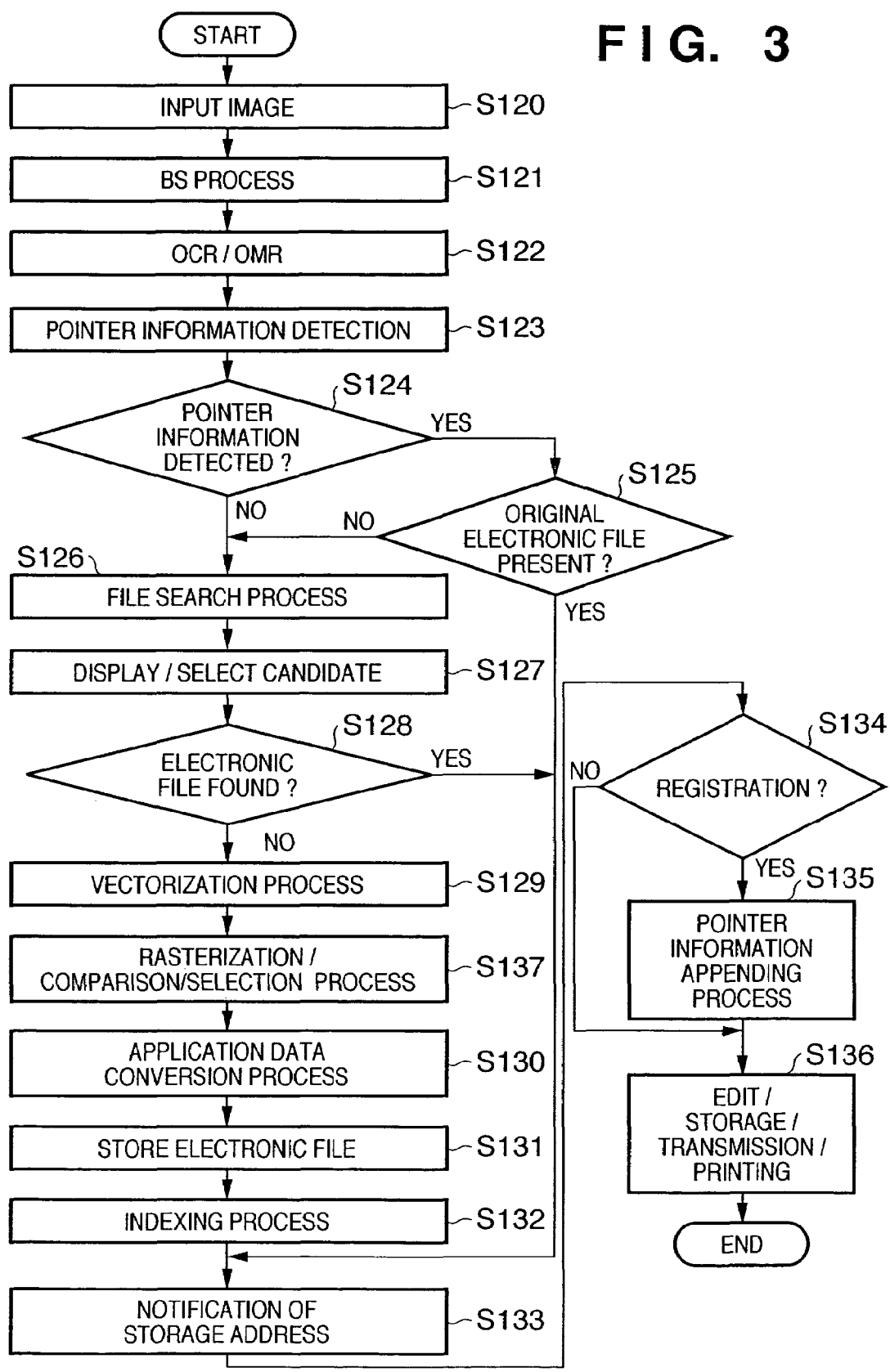
FIG. 3 is a flowchart showing the outline of overall processing executed by the image processing system according to the first embodiment of the present invention.

FIG. 3 is a flowchart showing the outline of the overall processing executed by the image processing system according to the first embodiment of the present invention.

In step S120, the image reader 110 of the MFP 100 reads a document by scanning the document in a raster order and obtains an image signal of 600 dpi (8 bits per pixel). The image signal undergoes a pre-process by the data processor 115 and is stored as image data for one page in the storage unit 111.

In step S121, the data processor 115 performs a block selection (BS) process. This process is executed under the control of the management PC 101.

More specifically, the CPU of the management PC 101 segments the image signal to be processed that is stored in the storage unit 111, into a text/line image part and halftone image part. The CPU further segments the text/line part into blocks of paragraphs, or tables or graphics formed by lines.

The halftone image part is segmented into independent objects (blocks) for respective so-called blocks (e.g., a rectangular image part block, background part block, and the like).

For each of blocks generated by this BS process, block information, i.e., information that pertains to the block is generated, as will be described later in detail.

In step S122, an object (block) corresponding to a two-dimensional barcode or URL (or URI (Uniform Resource Identifier)), which is recorded in the document image as additional information, is detected. If the additional information is a URL image, the URL image undergoes character recognition by OCR. On the other hand, if the additional information is a two-dimensional barcode image, the two-dimensional barcode image undergoes mark decoding by OMR (Optical Mark Recognition).

In step S122, each text block obtained in the BS process in step S121 undergoes character recognition by OCR.

In step S123, pointer information indicating a storage destination where an original electronic file of the scanned document image is stored is detected.

In step S124, it is determined whether any pointer information is detected. If no pointer information is detected (NO in step S124), the flow advances to step S126. On the other hand, if pointer information is detected (YES in step S124), the flow advances to step S125 to determine whether the original electronic file is present at the storage destination indicated by the pointer information.

The original electronic file is stored in, e.g., a hard disk within the client PC 102 in FIG. 1, the database 105, or the storage unit 111 of the MFP 100 itself. The original electronic file is searched for in these storages in accordance with the pointer information detected in step S123.

If the original electronic file is not found in step S125 (NO in step S125), the flow advances to step S126. On the other hand, if the original electronic file is found (YES in step S125), the flow advances to step S133.

Even if the original electronic file is found in step S125, the flow advances to step S126 if the original electronic file is image data typified by PDF or TIFF. On the other hand, if the found original electronic file is vector data previously generated in this process, the flow advances to step S133.

In step 126, a file search process of searching for an electronic file similar to the scanned document image input in step S120 is performed on the basis of the scanned document image.

In this file search process, a full-text search is performed by extracting words from the result of the OCR process performed for the text blocks in step S122 and searching for an electronic file containing the words. Alternatively, a layout search is performed by searching for an electronic file having a layout specified by the arrangement and attributes (image, text, or the like) of blocks in an image signal (or a similar layout).

In step S127, electronic files obtained as the search result of the file search process are displayed on the display 116 as candidates for the electronic file (or its thumbnail image (representative image)) corresponding to the scanned document image to accept selection of an electronic file to be processed from the candidates.

If there is only one candidate, the flow automatically advances from step S128 to step S133.

In step S128, it is determined whether one is selected from the candidates displayed on the display 116. If any electronic file is selected (YES in step S128), the flow advances to step S133. On the other hand, if no electronic file is selected (NO in step S128), the flow advances to step S129.

Even when any electronic file is selected in step S128, the flow advances to step S129 if the electronic file is image data typified by PDF or TIFF.

In step S129, a vectorization process of converting image data (the electronic file of the scanned document image (image data) input in step S120 or the electronic file of image data selected in step S127) into vector data is performed.

In this vectorization process, the size, style, and font of characters are further recognized for each text block having undergone the OCR process in step S122. The text block is converted into font data visually faithful to characters obtained by scanning the document. Table and graphic blocks formed of lines are converted into outline data. Image blocks are converted into separate JPEG files as image data.

The vectorization process for these various kinds of blocks is performed for each block on the basis of its block information. Also, the layout information of the block is stored.

In step S137, a rasterization/comparison/selection process is performed. In this process, the contents of a raster image obtained by rasterizing vector data obtained in the vectorization process is compared with those of the scanned document image, image information of the scanned document image itself or vector data corresponding to the scanned document image is selected as an electronic file corresponding to the scanned document image on the basis of the comparison result, and the selected one is stored in the storage unit 111. Note that details of this process will be described later.

In this process, the system may automatically select the image information or the corresponding vector data to be finally stored on the basis of a comparison result, or both images may be presented on the display 116 to be selected by the user.

With this process, if an electronic file corresponding to the scanned document image is reused, the electronic file can be stored and managed in a format intended by the user (image information/vector data).

In step S130, an application data conversion process of converting vector data obtained in step S129 into application data in a predetermined format (e.g., an RTF format) which can be processed by a word processing application is performed. In step S131, generated application data is stored as an electronic file corresponding to image data input in step S120 in the storage unit 111, document management server 106, or the like.

In step S132, in order to allow a direct search for an electronic file corresponding to a scanned document image upon performing a similar process, an indexing process of generating index information for electronic file search is performed. Generated index information is appended to, e.g., a search index file managed by the storage unit 111.

In step S133, the display 116 is notified of the storage address of the original electronic file found in step S125, the storage address of the electronic file selected in step S128, or the storage address of the electronic file stored in step S131.

In step S134, it is determined whether an operation instruction from the input unit 113 is a scanned document image registration instruction. If it is not the scanned document image registration instruction (NO in step S134), the flow advances to step S136. On the other hand, if it is the scanned document image registration instruction (YES in step S134), the flow advances to step S135.

The process in step S134 determines the presence/absence of an instruction for the execution of registration operation. The registration operation is performed when the user wants to register image information/vector data/an electronic file selected in step S128 of a scanned document image which contains no pointer information as an original electronic file in order to reuse the scanned document image in the image processing system.

For this reason, if the scanned document image contains pointer information, the registration operation may not be performed. Even when the scanned document image contains pointer information, and an original electronic file corresponding to the scanned document image is already present, the user may want to register the scanned document image again depending on the application purpose. Thus, the registration operation is not limited to a scanned document image which contains no pointer information.

If an instruction for copying a scanned document image (printing apparatus) is issued instead of one for the registration operation, the original electronic file may be registered and at the same time may be copied (printed) as a print of the scanned document image.

In step S135, a pointer information appending process is performed to generate pointer information for a scanned document image to be registered and append the pointer information as image data to an original electronic file corresponding to the scanned document image. The original electronic file, to which the pointer information is appended, is stored in, e.g., the hard disk in the client PC 102 in FIG. 1, the database 105, or the storage unit 111 of the MFP 100 itself. Simultaneously with the storage, the original electronic file may be printed from the printing unit 112.

In step S136, an operation window is presented on the display 116 to perform various kinds of processes (e.g., edit/storage/transmission (FAX transmission, e-mail transmission, or file transmission)/printing) for the original electronic file corresponding to the scanned document image. The various kinds of processes for the original electronic file can be performed via the operation window.

In the case of printing (copying) out of the various kinds of processes, the original electronic file undergoes image processes such as color processing, spatial frequency correction, and the like suitable for each object and then is printed from the printing unit 112. In the case of storage, the original electronic file is stored in the storage unit 111. In the case of transmission (file transmission), the original electronic file is converted into a general file format reusable in a file destination such as RTF (Rich Text Format), SVG, or the like and is sent to the file destination (e.g., the client PC 102) via the network I/F 114.

In this manner, in the image processing system, vector data is generally managed as an original electronic file corresponding to a scanned document image, and various kinds of processes can be performed using the vector data. Accordingly, the information amount of data to be processed can be reduced, and the storage efficiency improves. The transmission time can be shortened, and in outputting (display/printing) the original electronic file can be output as a high-quality image.

[Details of Each Process]

Details of each process will be explained.

[Block Selection Process]

Details of the BS process in step S121 will be described first.

Figure 4B:
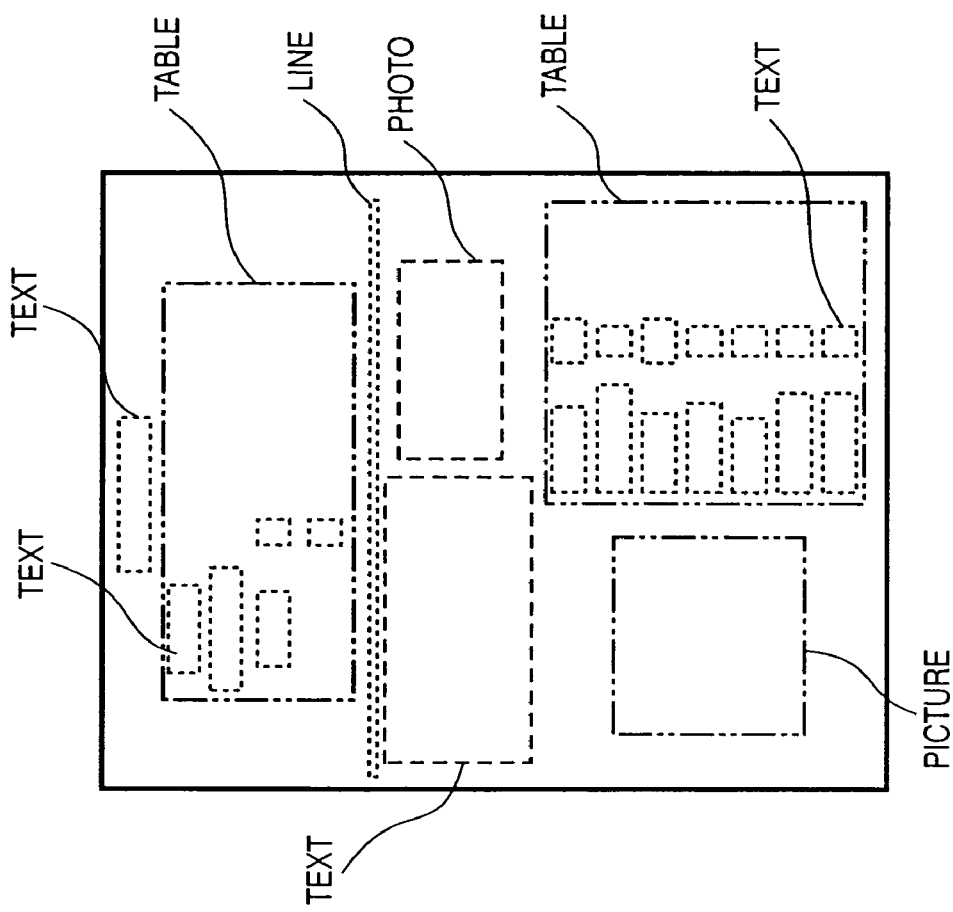
FIG. 4B is a view for explaining the concept of a block selection process according to the first embodiment of the present invention.
Figure 4A:
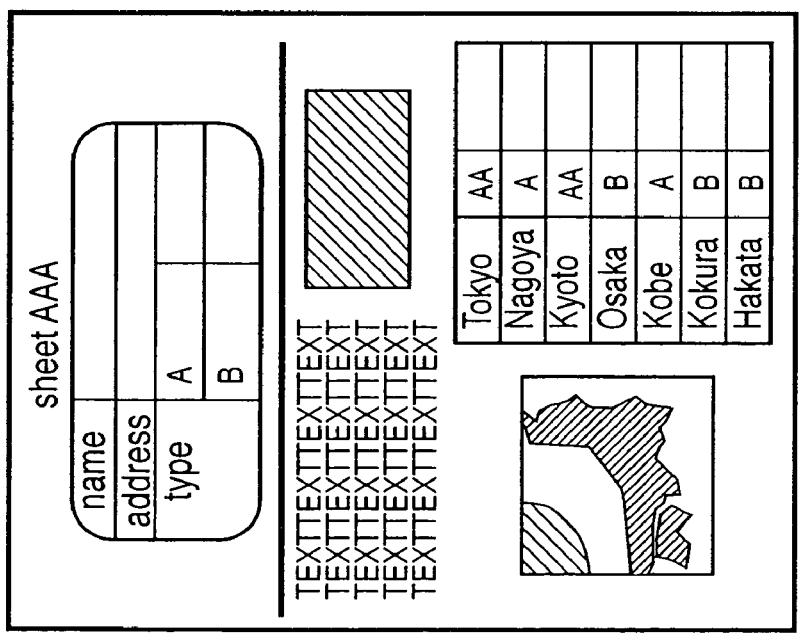
FIG. 4A is a view for explaining the concept of a block selection process according to the first embodiment of the present invention.

In the BS process, for example, a raster image in FIG. 4A is recognized as meaningful blocks, as shown in FIG. 4B. The attributes (e.g., text/picture/photo/line/table) of the blocks are determined to segment the image into blocks having different attributes.

An example of the BS process will be described below.

An input image is binarized into a monochrome image, and edge tracking is performed to extract a cluster of pixels surrounded by a black pixel edge. In a cluster of black pixels in a large area, edge tracking is also performed for internal white pixels to extract a cluster of white pixels. Further, a cluster of black pixels is recursively extracted from the cluster of white pixels with a predetermined area or more.

Obtained clusters of black pixels are classified by size and shape into blocks having different attributes. For example, a block having an aspect ratio of almost 1 and a size of a predetermined range is defined as a pixel cluster corresponding to a text. A part of adjacent characters which can be neatly grouped is defined as a text block. A plane pixel cluster is defined as a line block. A range of a black pixel cluster which neatly contains rectangular white pixel clusters with a predetermined size or more is defined as a table block. A region where indefinite pixel clusters scatter is defined as a photo block. A pixel cluster with another arbitrary shape is defined as a picture block.

In the BS process, a block ID which identifies each block is issued, and the attribute (image, text, or the like) of each block, the size, the position (coordinates) in the original document, and the block are associated and stored as block information in the storage unit 111. The block information is used in a vectorization process in step S129 and an indexing process in step S132 (to be described later in detail).

An example of block information will be described with reference to FIG. 5.

FIG. 5 shows an example of block information according to the first embodiment of the present invention.

As shown in FIG. 5, the block information comprises a block attribute which indicates the attribute of each block (1: text; 2: picture; 3: table; 4: line; and 5: photo), block position coordinates (X,Y), a block width W, a block height H, and the presence/absence of block OCR information (text data).

The block position coordinates (X,Y) indicate, e.g., position coordinates using those of the upper left corner of a document image as a start point (0,0). Each of the width W and height H is represented by, e.g., the number of pixels. In the BS process, input file information indicating the number N of blocks present in a document image (input file) is generated in addition to the block information. In the example of FIG. 5, the input file information N becomes equal to 6.

[OCR/OMR Process (Pointer Information Detection Process]

Details of the step S122 in FIG. 3 will be described with reference to FIG. 6.

Figure 6:
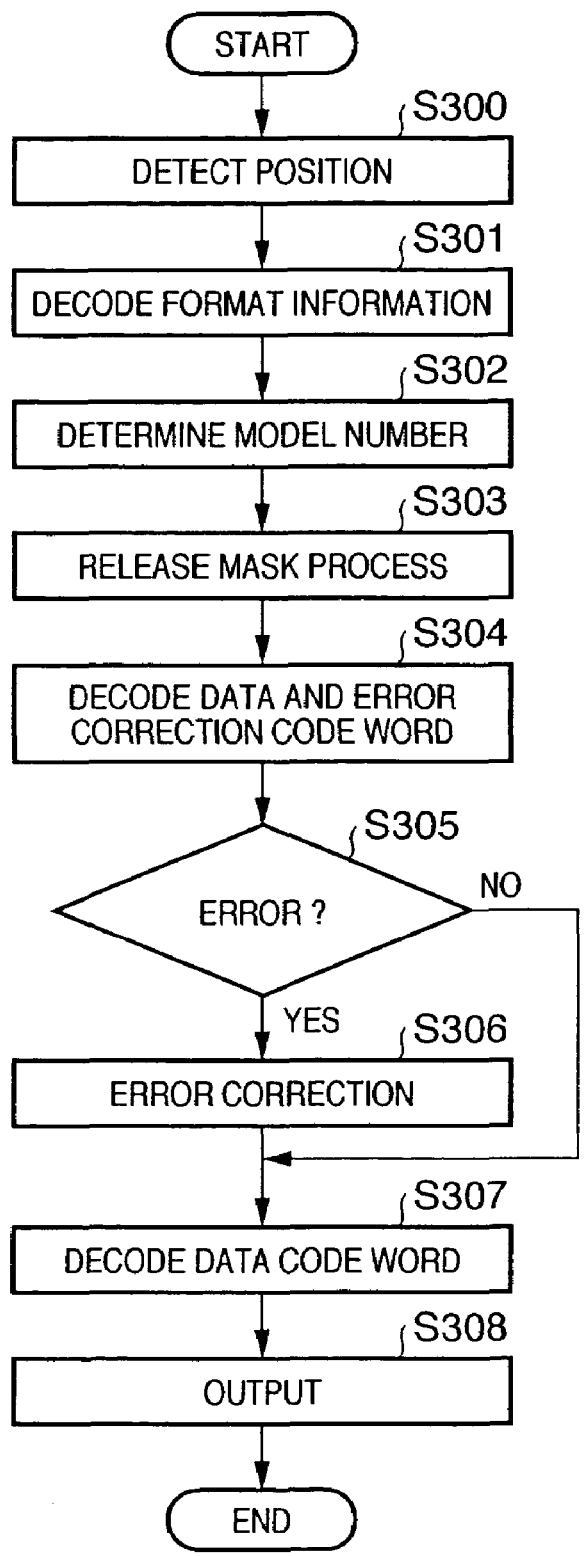
FIG. 6 is a flowchart showing details of a process in step S122 according to the first embodiment of the present invention.

FIG. 6 is a flowchart showing details of step S122 according to the first embodiment of the present invention.

Figure 7:
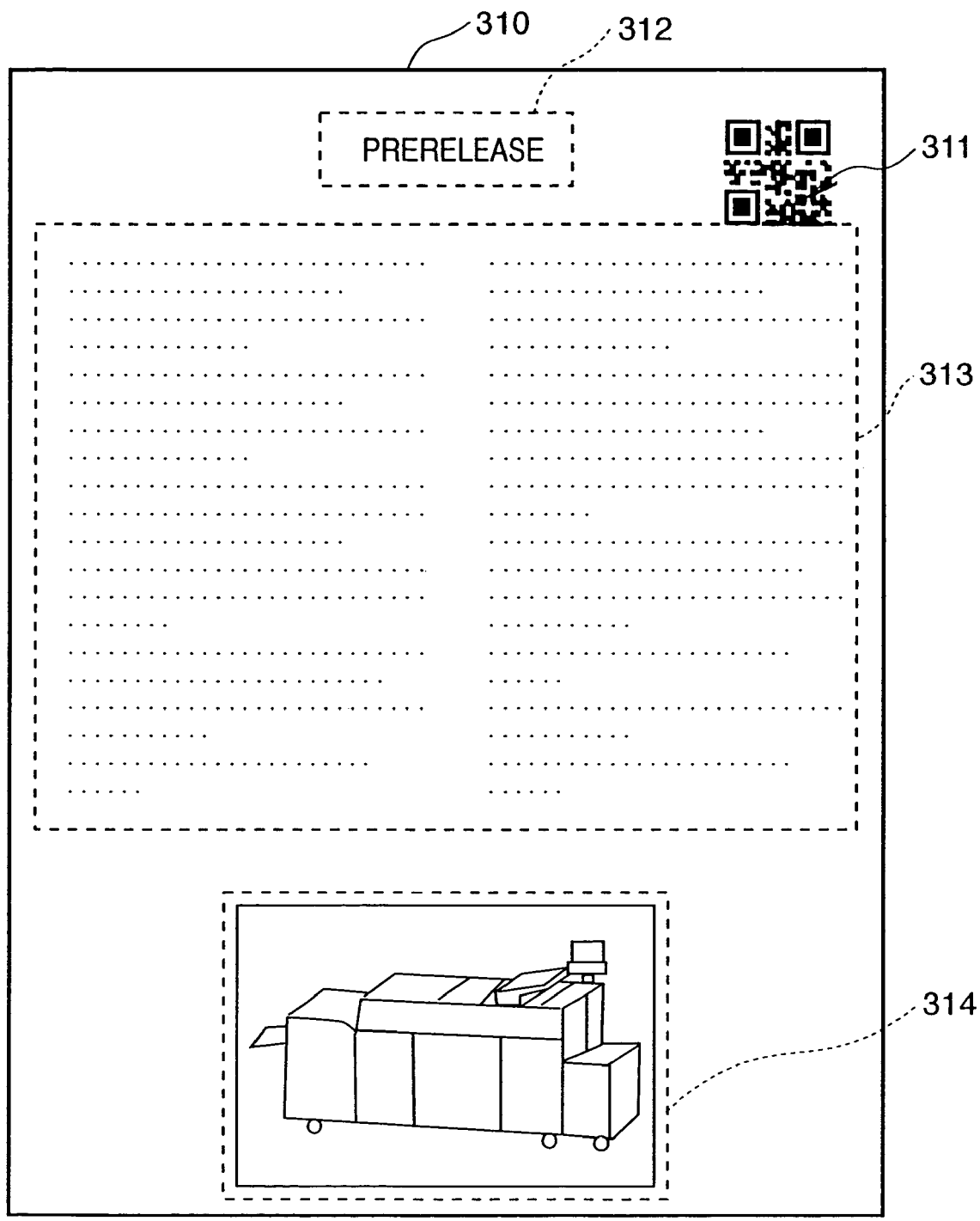
FIG. 7 is a view showing an example of an original image according to the first embodiment of the present invention.

Referring to FIG. 6, a process of decoding a two-dimension barcode (e.g., a QR code symbol) 311 appended into a document image 310 as shown in FIG. 7 and outputting a data character string will be described.

In step S300, a CPU (not shown) scans an image that represents the document 310 stored in a page memory in the data processor 115 to detect the position of the predetermined two-dimensional barcode symbol 311 from the result of the above-mentioned BS process.

Particularly in the first embodiment, a position detection pattern of a QR code serving as the two-dimensional barcode symbol 311 comprises identical position detection element patterns, which are located at three out of four corners of the two-dimensional barcode symbol.

Next, in step S301, format information that neighbors the position detection pattern is decoded to obtain an error correction level and mask pattern applied to the symbol.

In step S302, a model number which identifies the two-dimensional barcode symbol 311 is determined. After that, in step S303, an encoded region bit pattern is XORed using the mask pattern obtained from the format information to release the mask process.

In step S304, a symbol character is read in accordance with the layout rule corresponding to the model so as to decode a data code word and error correction code word of the two-dimensional barcode symbol 311.

In step S305, it is determined whether the decoded error correction code word includes an error. If no error is detected (NO in step S305), the flow advances to step S307; otherwise (YES in step S305), the flow advances to step S306 to correct that error.

In step S307, the data code word is divided into segments on the basis of a mode indicator and character count indicator from the error-corrected data.

Finally, in step S308, data characters are decoded on the basis of a mode used, thus outputting the decoding result.

Note that data to be encoded in the two-dimensional barcode represents address information (pointer information) of the corresponding electronic file, which is URL (URI) or full path information indicating the storage destination of an electronic file formed of a server name, directory, and file name.

In this embodiment, the document image 310, to which the pointer information is appended as the two-dimensional barcode, has been described. Alternatively, the pointer information may be recorded in the document image 310 using a character string. In this case, a text block according to a predetermined rule is detected by the above BS process, and characters in the text image that indicates the pointer information undergo character recognition, thus obtaining the address information of the original electronic file.

Furthermore, the pointer information can be assigned by embedding information in character spacings by applying imperceptible modulation to, e.g., the spacings between neighboring characters in a text block 312 or 313 of the document image 310 shown in FIG. 7. In this case, when the character spacings are detected upon executing a character recognition process (to be described later), pointer information can be obtained. Also, the pointer information can be assigned as a digital watermark in a natural image 314.

[Search Process]

An original electronic file search process based on the pointer information in step 125 in FIG. 3 will be described below using the flowchart of FIG. 8.

Figure 8:
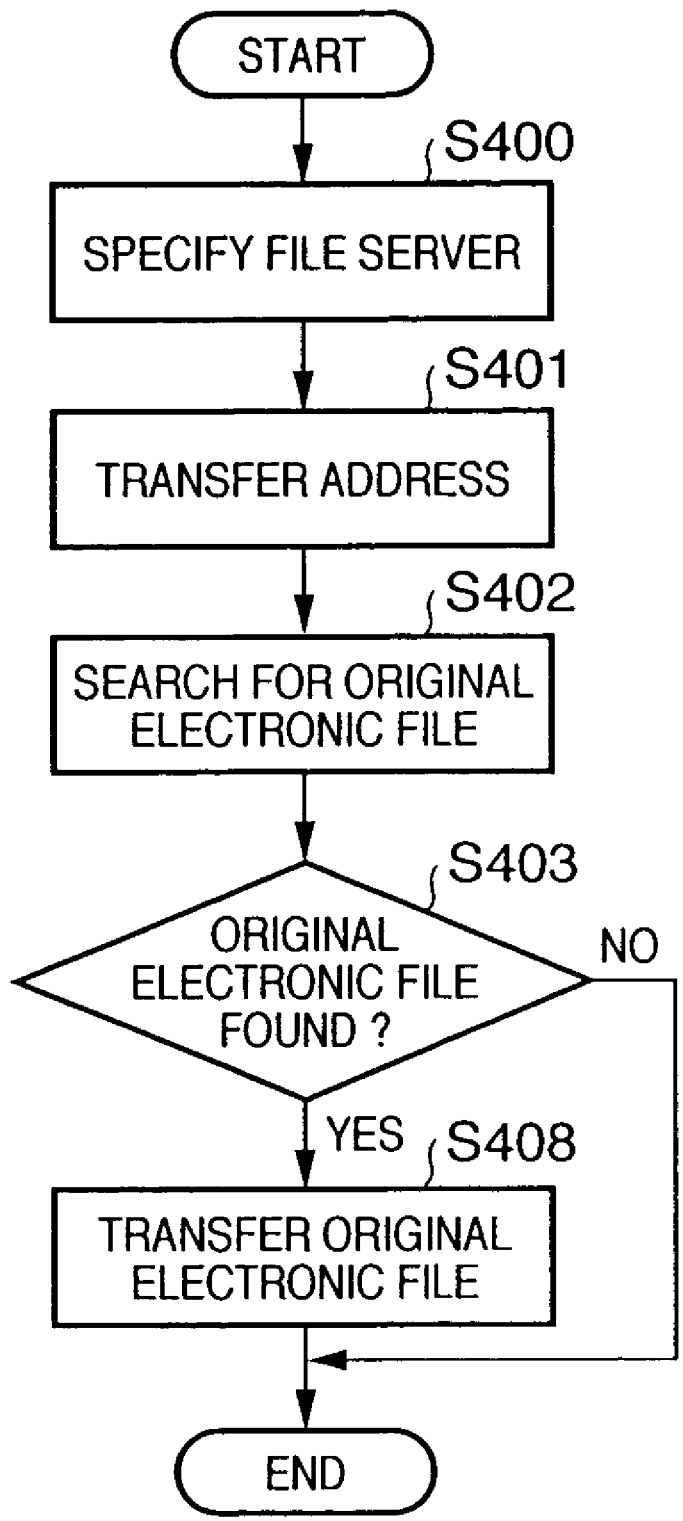
FIG. 8 is a flowchart showing an original electronic file search process according to the first embodiment of the present invention.

FIG. 8 is a flowchart showing the original electronic file search process according to the first embodiment of the present invention.

In step S400, the MFP 100 specifies a file server serving as the storage destination of an electronic file on the basis of the address information in the pointer information of the electronic file.

Note that the file server indicates the document management server 106 that manages the database 105 or the client PC 102, or the MFP 100 itself that incorporates the storage unit 111.

In step S401, the MFP 100 transfers the address information to the identified file server.

In step S402, upon reception of the address information, the file server searches for the corresponding original electronic file. In step S403, it is determined whether the original electronic file exists. If the original electronic file is not found (NO in step 403), the file server sends a message that advises the absence of the file to the MFP 100.

On the other hand, if the original electronic file is found (YES in step 403), the flow advances to step S408. The file server notifies the MFP 100 of the address of the original electronic file and transfers the original electronic file to the MFP 100.

Figure 9:
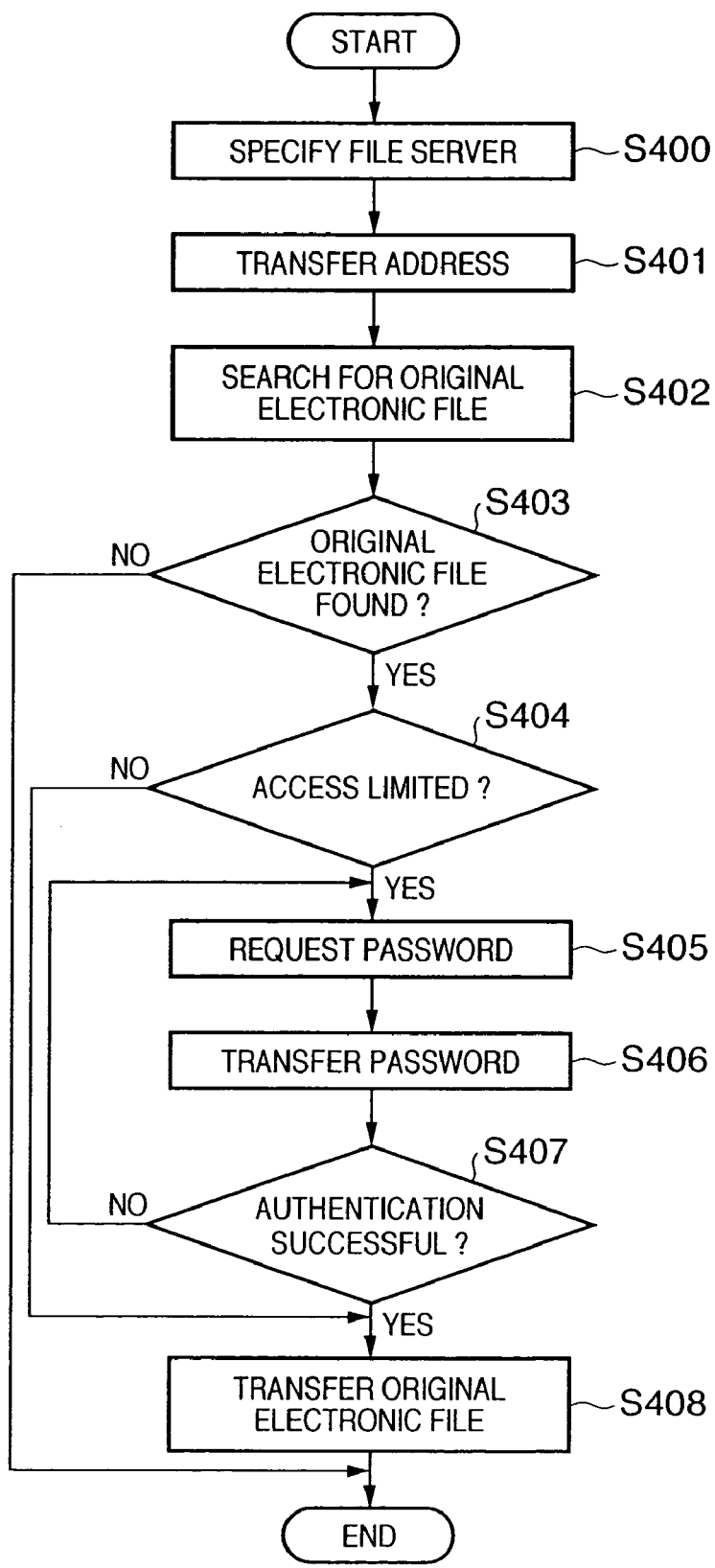
FIG. 9 is a flowchart showing an application of the original electronic file search process according to the first embodiment of the present invention.

To increase security in the process in FIG. 8, authentication of the user who requests the original electronic file may be performed as shown in FIG. 9. That is, reuse, by a third party, of some of original electronic files to be processed must often be limited. The process in FIG. 8 has been explained under the condition that all original electronic files stored in the file server can be freely accessed, and the entire file or some objects of the file are reusable.

A case will be described with reference to FIG. 9 wherein access to an original electronic file is limited differently for each user.

FIG. 9 is a flowchart showing an application of the original electronic file search process according to the first embodiment of the present invention.

Note that the same step numbers as in the process in FIG. 9 denote the same processes as those in the process in FIG. 8, and a description thereof will be omitted.

Referring to FIG. 9, if the original electronic file is found in step S403, it is determined in step S404 whether the access to the original electronic file is limited. If the access is not limited (NO in step S404), the flow advances to step S408. If the access is limited (YES in step S404), the flow advances to step S405. In step S405, the MFP 100 presents a password input window on the display 116 and prompts the user operating the MFP 100 to input a password.

In step S406, when a password is input, the MFP transfers the password to the file server. In step S407, it is determined whether the file server has made authentication successfully on the basis of the password. If the authentication has failed (NO in step S407), the flow returns to step S405. On the other hand, if the authentication has succeeded (YES in step S407), the flow advances to step S408.

If the authentication has failed in step S407, password input is requested again. However, if the number of times of authentication failures exceeds a predetermined value, the attempt at authentication may be determined as operation by an invalid user, and the process itself may be stopped.

The authentication method in step S407 is not limited to one using a password, and various other authentication methods such as popular biometric authentication (e.g., fingerprint authentication), authentication using a card, and the like can be adopted.

This authentication can be applied to a file search process (to be described below).

The same authentication can be applied to a case wherein the original electronic file cannot be found in the file server, i.e., in the series of processes in steps S129 to S132 in FIG. 3. That is, if a limitation of the access right to a given scanned document image is detected, the processes from step S129 are executed only when authentication is successful, thus limiting processes executable by the image processing system for each user or each scanned document image with high secrecy.

[File Search Process]

Details of the process in step S126 in FIG. 3 will be described with reference to FIGS. 5 and 10.

Figure 10:
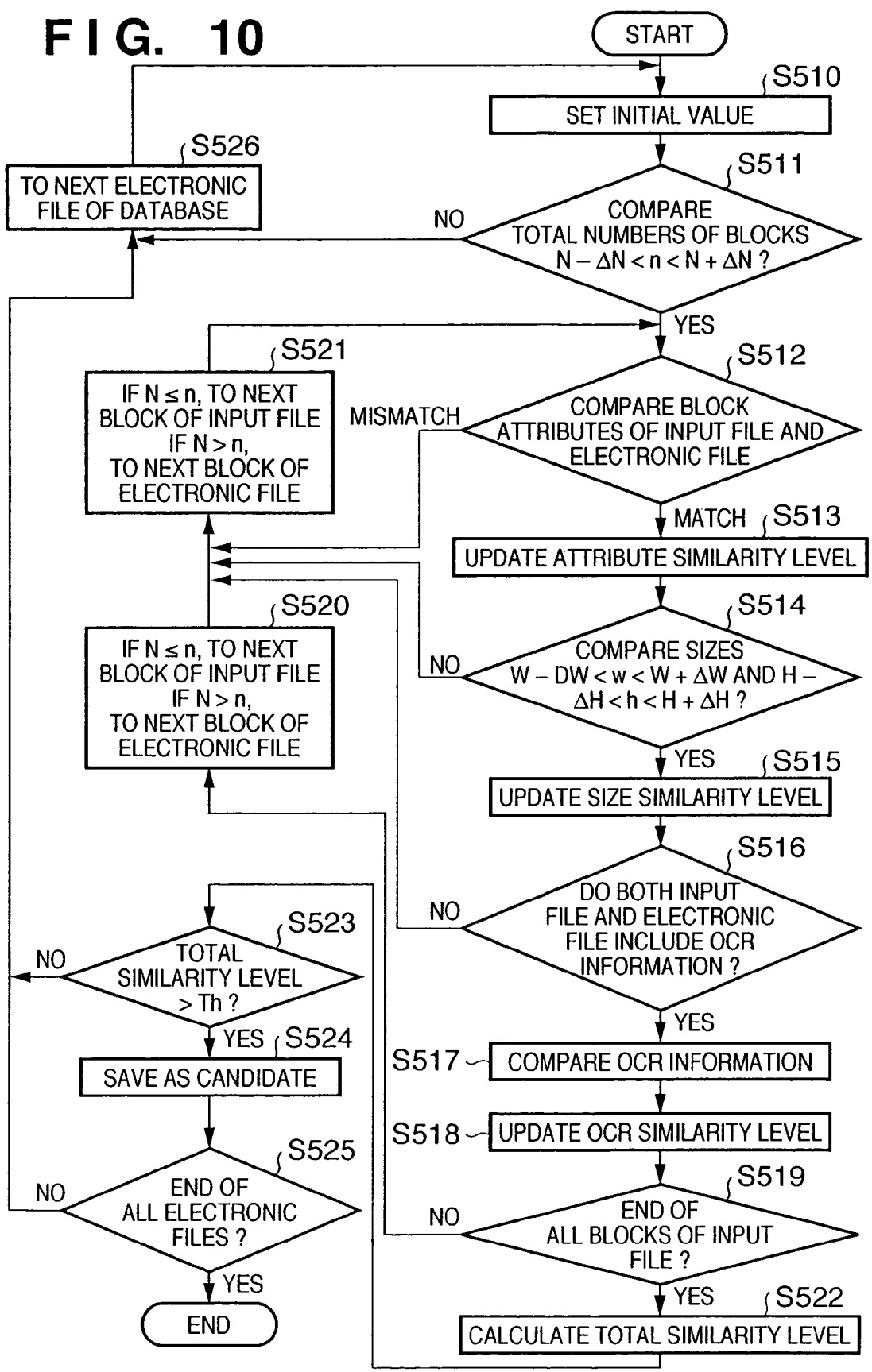
FIG. 10 is a flowchart showing details of a process in step S126 according to the first embodiment of the present invention.

FIG. 10 is a flowchart showing the details of the process in step S126 according to the first embodiment of the present invention.

The process in step 126 is performed if a scanned document image (input file) has no pointer information in step 124, if pointer information is available but no original electronic file is found or if a found original electronic file is an image file.

Assume that the process in step S126 uses block information and input file information obtained in the process in step S122. As a specific example, the block information and input file information shown in FIG. 5 will be described. In the block information in FIG. 5, respective blocks are named and managed as blocks 1, 2, 3, 4, 5, and 6 in ascending order of coordinate X (i.e., X1<X2<X3<X4<X5<X6).

A process of searching (performing a layout search process) for an electronic file similar to an input file in the database managed by the file server using the block information and input file information will be described with reference to FIG. 10. Assume that electronic files managed by the database have the same kinds of block information and file information as those in FIG. 5. The layout search process is performed while sequentially comparing electronic files in the database with the input file.

In step S510, various kinds of initial values are set to calculate similarity levels and the like (to be described later). In step 511, the total numbers of blocks are compared. Let n be the total number of blocks of the input file; N, the total numbers of blocks to be compared in the database; and $\Delta N$, an error. In this comparison, it is determined whether the conditional expression $N-\Delta N<n<N+\Delta N$ is satisfied.

In step S511, if the conditional expression is not satisfied (NO in step S511), the flow advances to step S526. In step S526, an electronic file to be processed is set to the next electronic file, and the flow returns to step S510. On the other hand, if the conditional expression is satisfied (YES in step S511), comparison of the input file with the electronic file to be compared based on the block information is performed in the processes from step S512.

In step S512, the block attribute of a block to be processed of an electronic file to be compared is compared with that of a block to be processed of the input file. If the block attributes do not coincide with each other, the flow advances to step S521. In step S521, if the total number N of blocks of the electronic file to be compared $\geq$ the number n of blocks of the input file, the next block of the input file is set as the block to be processed. On the other hand, if the total number N of blocks of the electronic file to be compared < the number n of blocks of the input file, the next block of the electronic file to be compared is set as the block to be processed.

If the block attributes coincide with each other in step S512, the flow advances to step S513. In step S513, the attribute similarity level is calculated, and its value is updated.

In step S514, the size (width and height) of the block to be processed of the electronic file to be compared is compared with that of the block to be processed of the input file. Let w be the width of the block to be processed in the input file; h, the height of the block; W, the width of the block to be processed in the electronic file to be compared; $\Delta W$, an error in the width W; H, the height of the block; and $\Delta H$, an error in the height H. In this comparison, it is determined whether the conditional expressions $W-\Delta W<w<W+\Delta W$ and $H-\Delta H<h<H+\Delta H$ are satisfied.

In addition to the conditional expressions, comparison may be performed on the basis of the block positions (X,Y).

If the conditional expressions are not satisfied in step S514 (NO in step S514), the flow advances to step S521. On the other hand, the conditional expressions are satisfied (YES in step S514), the flow advances to step S515. In step S515, the size similarity level is calculated, and its value is updated.

In step S516, it is determined on the basis of the block information whether the block to be processed of the input file and that of the electronic file to be compared each have OCR information. If no OCR information is present (NO in step S516), the flow advances to step S521. On the other hand, if any OCR information is found (YES in step S516), the flow advances to step S517 to compare the OCR information with each other.

In step S518, the OCR similarity level is calculated, and its value is updated. In step S519, all blocks in the input file have undergone the comparison process. If the comparison process has not ended (NO in step S519), the flow advances to step S520. If the total number N of blocks of the electronic file to be compared $\geq$ the number n of blocks of the input file in step S520, the next block of the input file is set as the block to be processed. On the other hand, if the total number N of blocks of the electronic file to be compared > the number n of blocks of the input file, the next block of the electronic file to be compared is set as the block to be processed.

If the comparison process has ended in step S519 (YES in step S519), the flow advances to step S522.

In step S522, the total similarity level is calculated on the basis of the similarity levels calculated in steps S513, S515, and S518.

Since a method of calculating each similarity level in step S513, S515, or S518 can use a known technique, a detailed description thereof will be omitted.

In step S523, it is determined whether the total similarity level is higher than a predetermined threshold value Th. If the total similarity level is lower than the predetermined threshold value Th (NO in step S523), the flow advances to step S526. On the other hand, if the total similarity level is higher than the predetermined threshold value Th (YES in step S523), the flow advances to step S524, and the electronic file is stored as a similar candidate of the input file.

In step S525, it is determined whether the comparison process for all electronic files in the database has ended. If the comparison process has not ended (NO in step S525), the flow advances to step S526. On the other hand, if the comparison process has ended (YES in step S525), the process ends.

With the above-mentioned process, if there is an electronic file having the total similarity level higher than the threshold value Th, that file is determined as a candidate for an electronic file similar to the input file. By outputting the candidate for the electronic file in step S127 in FIG. 3, the user can select the desired electronic file.

[Vectorization Process]

The vectorization process in step S129 in FIG. 3 will be described in detail below.

In the vectorization process, characters undergo the character recognition process.

In the character recognition process, an image extracted for each character is recognized using one of pattern matching methods to obtain a corresponding character code. In this character recognition process, an observation feature vector obtained by converting a feature acquired from a character image into a several-ten-dimensional numerical value string is compared with a dictionary feature vector obtained in advance for each character type, and a character type with a shortest distance is output as a recognition result.

Various known methods are available for feature vector extraction. For example, a method of dividing a character into a mesh pattern, and counting character lines in respective meshes as line elements depending on their directions to obtain a (mesh count)-dimensional vector as a feature is known.

When a text block undergoes the character recognition process, the writing direction (horizontal or vertical) is determined for that text block, lines are extracted in the corresponding directions, and character images are then obtained by extracting characters.

Upon determining the writing direction (horizontal or vertical), horizontal and vertical projections of pixel values in that text block are calculated, and if the variance of the horizontal projection is larger than that of the vertical projection, that text block can be determined as a horizontal writing block; otherwise, that block can be determined as a vertical writing block. Upon decomposition into character strings and characters, in case of horizontal writing, lines are extracted using the horizontal projection, and characters are extracted based on the vertical projection for the extracted line. In case of a vertical writing text block, the relationship between the horizontal and vertical parameters may be exchanged.

Note that a character size can be detected with the character recognition process.

A plurality of sets of dictionary feature vectors for the number of character types used in the character recognition process are prepared in correspondence with character shape types, i.e., font types, and a font type is output together with a character code upon matching, thus recognizing the font of a character.

Using a character code and font information obtained by the character recognition process, and outline data prepared for each character code and font, information of a character part is converted into vector data. If a document image is a color image, the color of each character is extracted from the color image and is recorded together with vector data.

With the above-mentioned processes, image information which belongs to a text block can be converted into vector data with a nearly faithful shape, size, and color.

For picture, line, and table blocks other than a text block, outlines of pixel clusters extracted in each block are converted into vector data.

Figure 11:
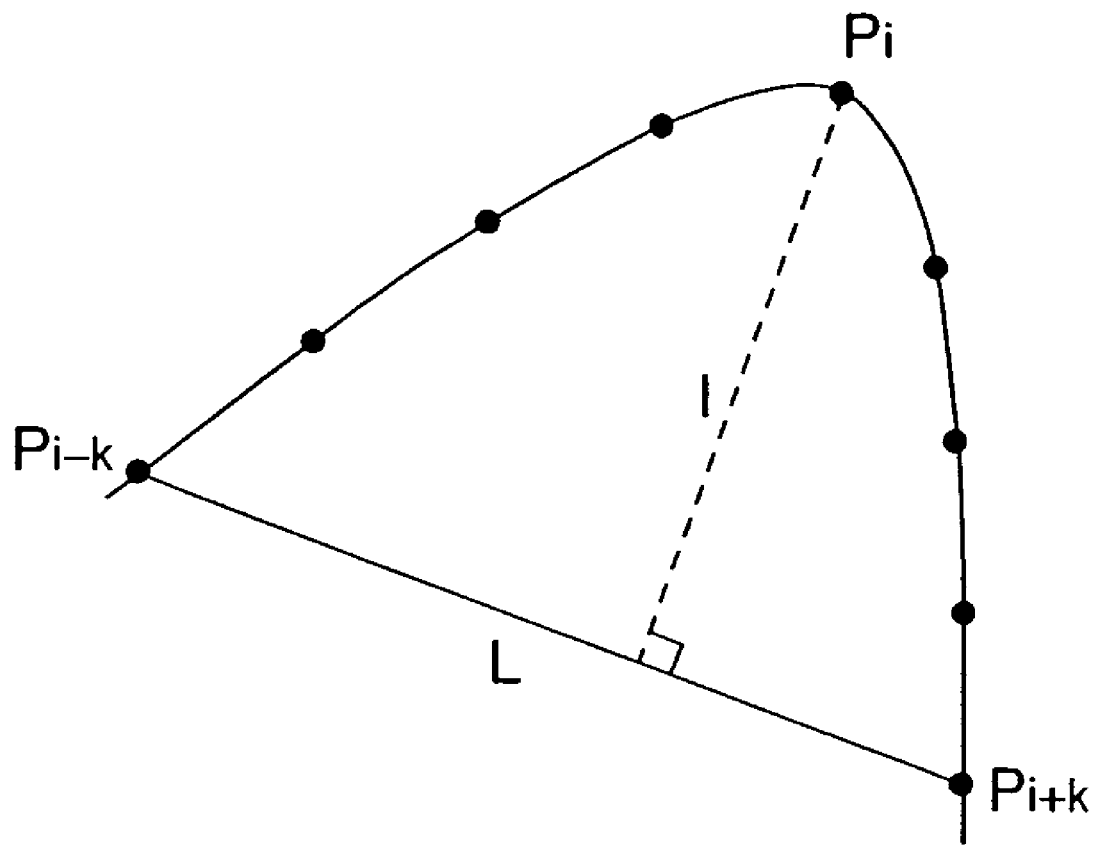
FIG. 11 is a view for explaining a vectorization process according to the first embodiment of the present invention.

More specifically, a point sequence of pixels which form an outline is divided into sections at a point which is considered as a corner, and each section is approximated by a partial line or curve. The corner means a point corresponding to a maximal curvature, and the point corresponding to the maximal curvature is obtained as a point where a distance between an arbitrary point Pi and a chord which is drawn between points Pi−k and Pi+k separated k points from the point Pi in the left and right directions becomes maximal, as shown in FIG. 11.

Furthermore, let R be (chord length/arc length between Pi−k and Pi+k). Then, a point where the value R is equal to or smaller than a threshold value can be considered as a corner. Sections obtained after division at each corner can be vectorized using a method of least squares or the like with respect to a point sequence for a line, and a ternary spline function or the like for a curve.

When an object has an inside outline, it is similarly approximated by a partial line or curve using a point sequence of a white pixel outline extracted in the BS process.

As described above, using partial line approximation, an outline of a graphic with an arbitrary shape can be vectorized. When a document image is a color image, the color of a graphic is extracted from the color image and is recorded together with vector data.

Figure 12:
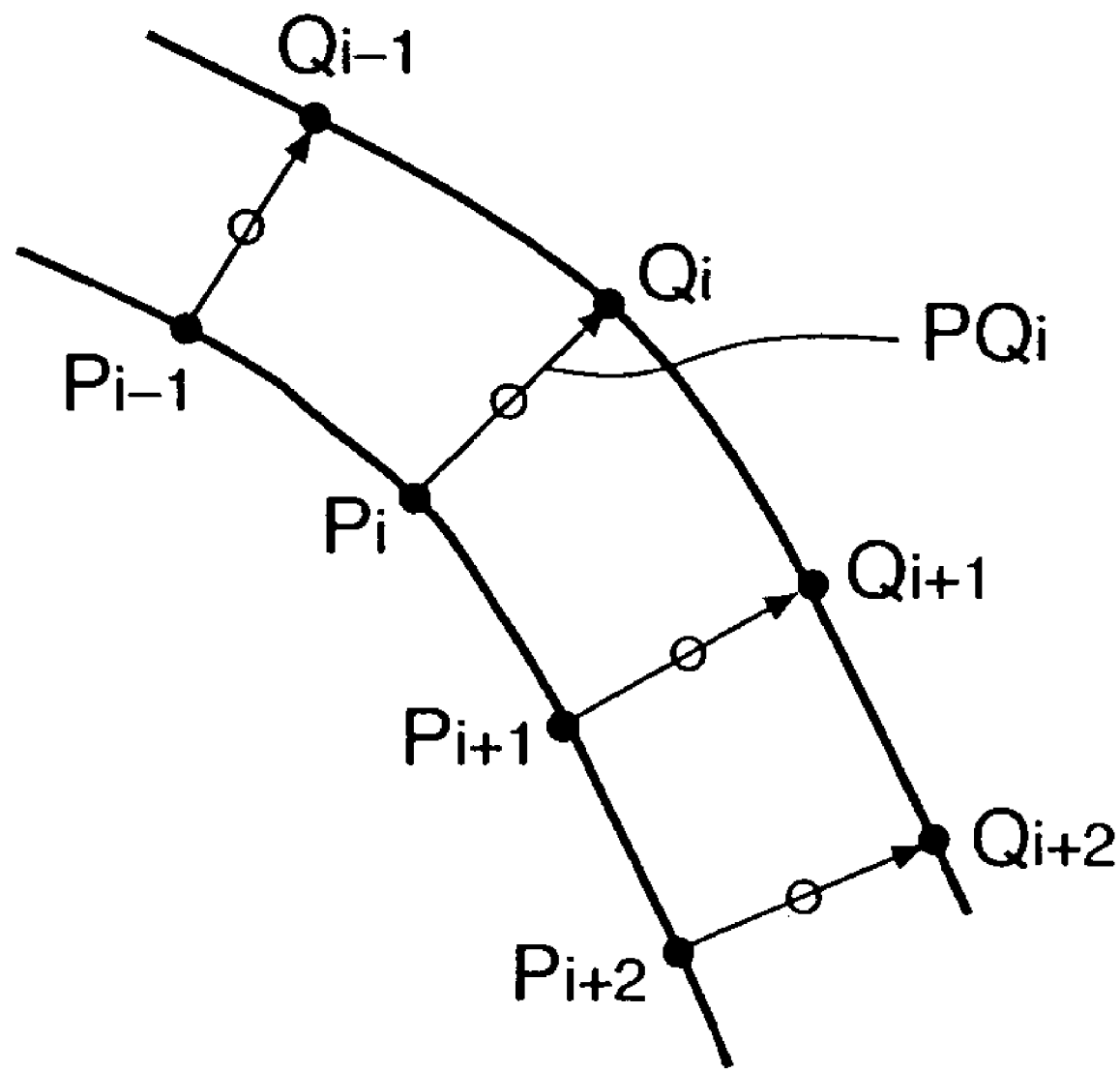
FIG. 12 is a view for explaining the vectorization process according to the first embodiment of the present invention.

Furthermore, when an outside outline is close to an inside outline or another outside outline in a given section, as shown in FIG. 12, two outlines may be combined to express a line with a given width.

More specifically, lines are drawn from respective points Pi on a given outline to points Qi on another outline, each of which has a shortest distance from the corresponding point. When the distances PQi maintain a constant value or less on the average, the section of interest is approximated by a line or curve using the middle points of the distances PQi as a point sequence, and the average value of the distances PQi is set as the width of that line or curve. A line or a table ruled line as a set of lines can be efficiently vectorized as a set of lines having a given width, as described above.

Note that vectorization using the character recognition process for a text block has been explained. A character which has the shortest distance from a dictionary as a result of the character recognition process is used as a recognition result. When this distance is equal to or larger than a predetermined value, the recognition result does not always match an original character, and a wrong character having a similar shape is often recognized.

Therefore, in the present invention, such text block is handled in the same manner as a general line image, as described above, and is converted into outline data. That is, even a character that causes a recognition error in the conventional character recognition process can be prevented from being vectorized to a wrong character, but can be vectorized based on outline data which is visually faithful to image data.

Note that a photo block cannot be vectorized, and is output as image data.

A grouping process of grouping vector data obtained in the vectorization process for each picture block will be described below with reference to FIG. 13.

Figure 13:
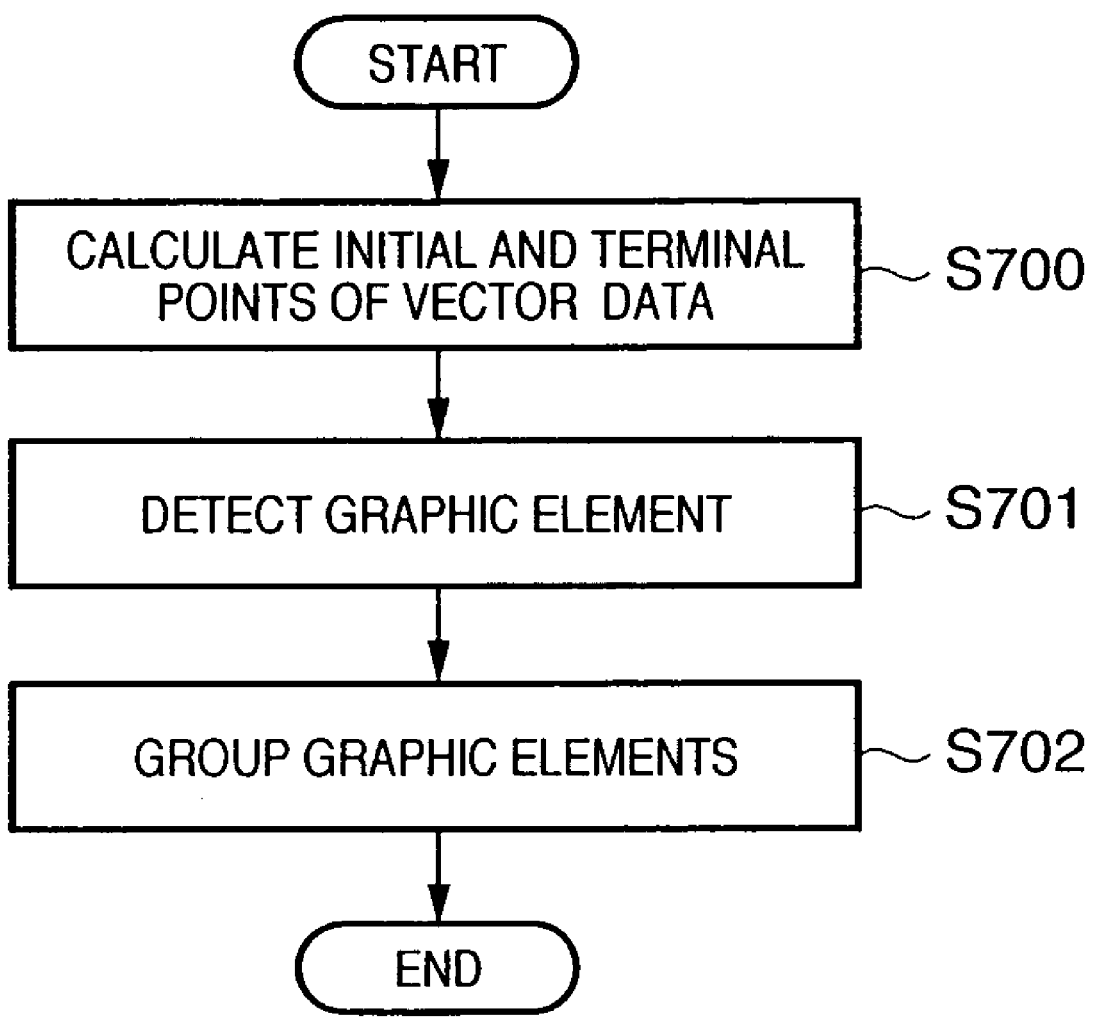
FIG. 13 is a flowchart showing a vector data grouping process according to the first embodiment of the present invention.

FIG. 13 is a flowchart showing the vector data grouping process according to the first embodiment of the present invention.

A process of grouping vector data for each picture block will be described particularly with reference to FIG. 13.

In step S700, initial and terminal points of each vector data are calculated. In step S701, using the initial point information and terminal point information of respective vectors, a graphic element is detected.

Detecting a graphic element is to detect a closed graphic formed by partial lines. Such detection is made by applying the principle that each vector which forms a closed shape has vectors coupled to its two ends.

In step S702, other graphic elements or partial lines present in the graphic element are grouped to set a single graphic object. If other graphic elements or partial lines are not present in the graphic element, that graphic element is set as a graphic object.

Details of the process in step S701 in FIG. 13 will be described with reference to FIG. 14.

Figure 14:
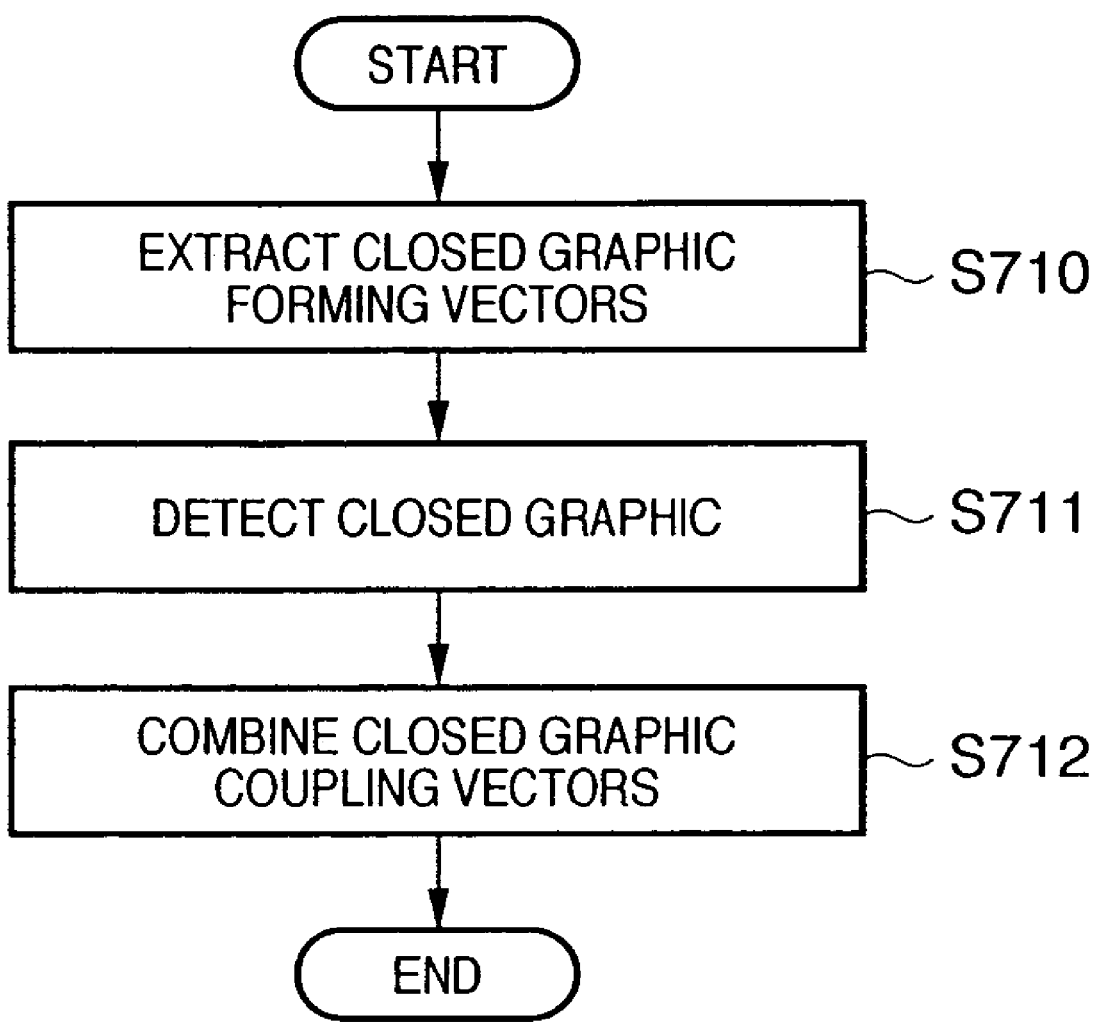
FIG. 14 is a flowchart showing details of a process in step S701 according to the first embodiment of the present invention.

FIG. 14 is a flowchart showing details of the process in step S701 according to the first embodiment of the present invention.

In step S710, closed graphic forming vectors are extracted from vector data by excluding unwanted vectors, two ends of which are not coupled to other vectors.

In step S711, an initial point of a vector of interest of the closed graphic forming vectors is set as a start point, and vectors are traced clockwise in turn. This process is made until the start point is reached, and all passing vectors are grouped as a closed graphic that forms one graphic element. Also, all closed graphic forming vectors present in the closed graphic are grouped. Furthermore, an initial point of a vector which is not grouped yet is set as a start point, and the same process is repeated.

Finally, in step S712, of the unwanted vectors excluded in step 710, those (closed-graphic-coupled vectors) which join the vectors grouped as the closed graphic in step 711 are detected and are grouped as one graphic element.

With the above-mentioned process, a picture block can be handled as an independently reusable graphic object.

[Application Data Conversion Process]

The application data conversion process in step S130 in FIG. 3 will be described in detail.

Figure 15:
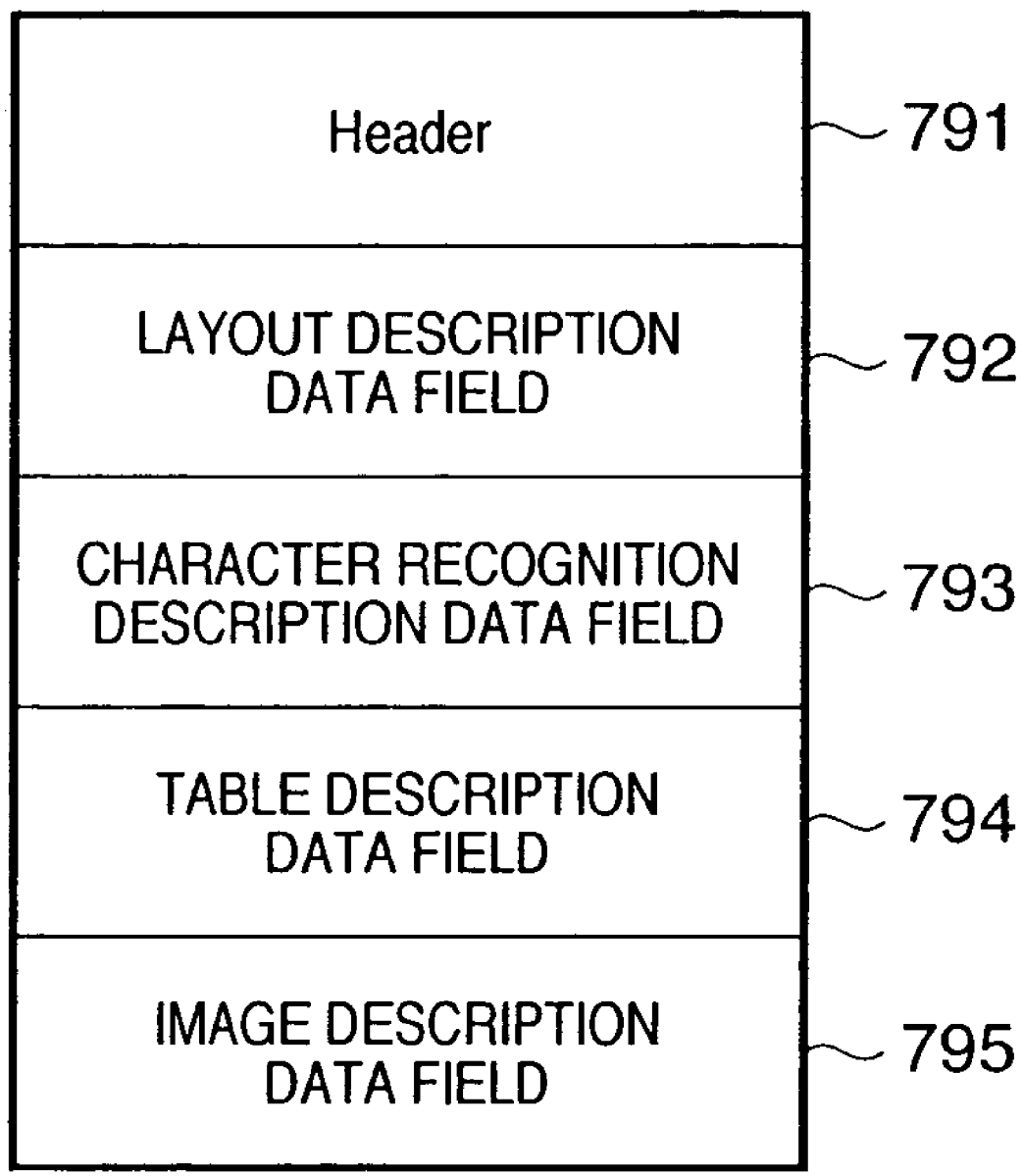
FIG. 15 is a view showing the data structure of a DAOF.

The result of the BS process in step S121 in FIG. 3 and that of the vectorization process in step S129 are converted into a file of an intermediate data format, as shown in FIG. 15. Such intermediate data format is called a document analysis output format (DAOF).

The data structure of the DAOF will be described with reference to FIG. 15.

FIG. 15 shows the data structure of the DAOF according to the first embodiment of the present invention.

Referring to FIG. 15, a header 791 holds information associated with a document image to be processed. A layout description data field 792 holds attribute information and block address information of respective blocks which are recognized for respective attributes such as TEXT (text), TITLE (title), CAPTION (caption), LINEART (line image), PICTURE (natural image), FRAME (frame), TABLE (table), and the like.

A character recognition description data field 793 holds character recognition results obtained by performing character recognition of TEXT blocks such as TEXT, TITLE, CAPTION, and the like.

A table description data field 794 stores details of the structure of TABLE blocks. An image description data field 795 stores image data of PICTURE blocks, LINEART blocks, and the like extracted from the document image data.

Such DAOF itself is often stored as a file in place of intermediate data. However, in the state of a file, a general word processing application cannot reuse individual objects (blocks).

Hence, in this embodiment, the application data conversion process (step 130) of converting the DAOF into application data which can be used by a word processing application will be described in detail with reference to FIG. 16.

Figure 16:
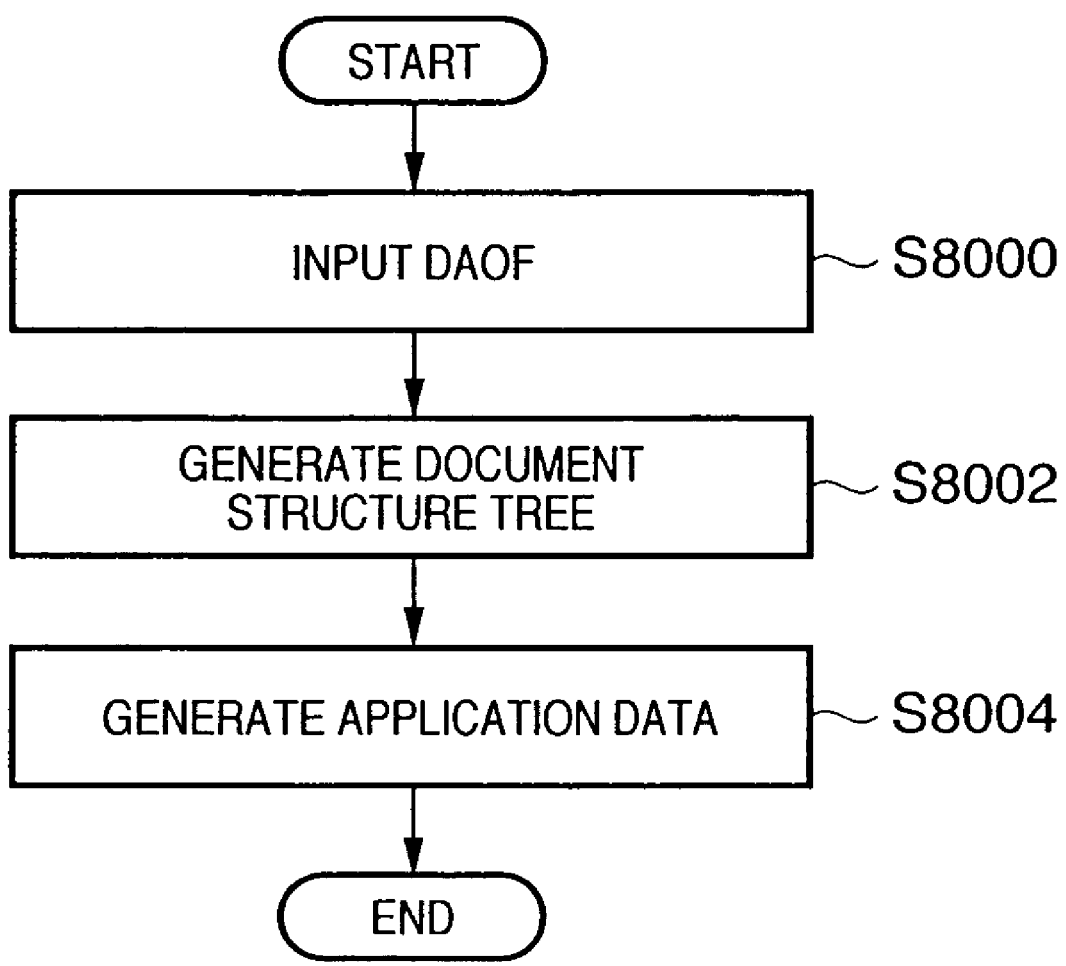
FIG. 16 is a flowchart showing details of a process in step S130 according to the first embodiment of the present invention.

FIG. 16 is a flowchart showing details of the process in step S130 according to the first embodiment of the present invention.

In step 8000, DAOF data is input. In step 8002, a document structure tree which serves as a basis of application data is generated. In step 8004, actual data in the DAOF are input based on the document structure tree, thus generating actual application data.

Details of the process in step S8002 in FIG. 16 will be described with reference to FIG. 17.

Figure 17:
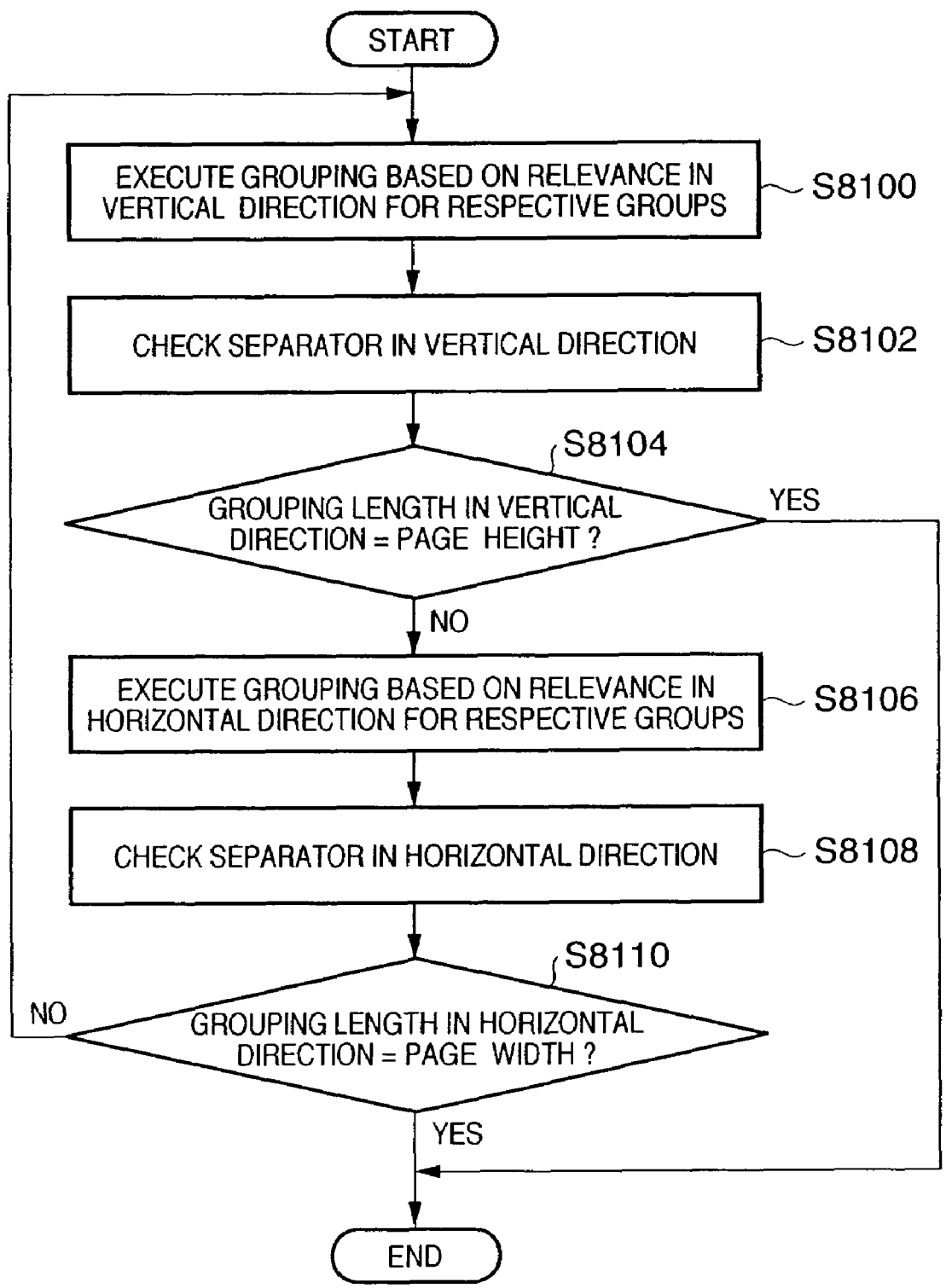
FIG. 17 is a flowchart showing details of a process in step S8002 according to the first embodiment of the present invention.
Figure 18A:
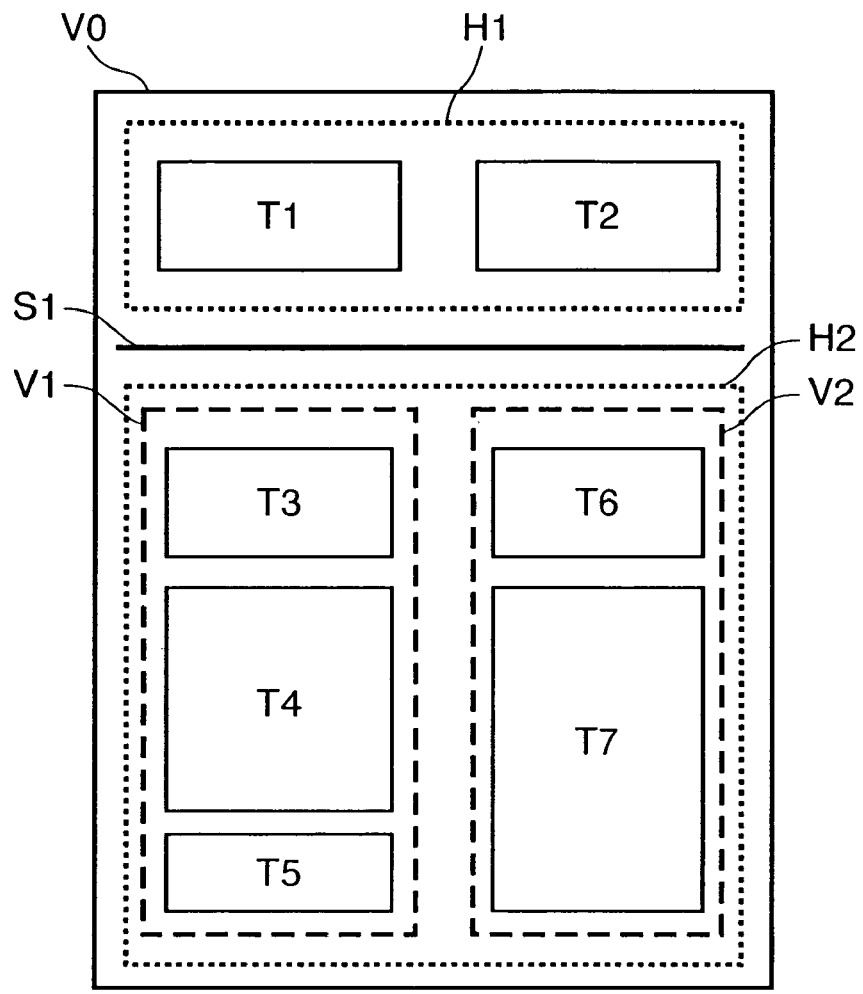
FIG. 18A is an explanatory view of a document structure tree according to the first embodiment of the present invention.
Figure 18B:
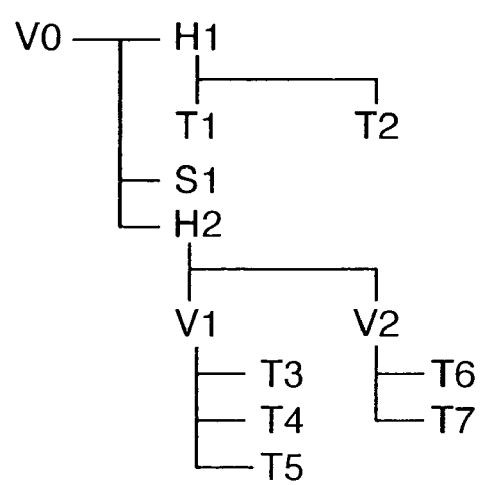
FIG. 18B is an explanatory view of the document structure tree according to the first embodiment of the present invention.

FIG. 17 is a flowchart showing the details of the process in step S8002 according to the first embodiment of the present invention. FIGS. 18A and 18B are explanatory views of a document structure tree according to the first embodiment of the present invention.

In the process shown in FIG. 17, as a basic rule of the overall control, the flow of process transits from a microblock (single block) to a macroblock (a set of blocks).

In this case, a block indicates a microblock and macroblock.

In step 8100, re-grouping is done for respective blocks on the basis of relevance in the vertical direction. Immediately after the flow starts, determination is made for respective microblocks.

Note that relevance can be defined by determining whether the distance between neighboring blocks is small, blocks have nearly the same block widths (heights in case of the horizontal direction), and the like. Information of the distances, widths, heights, and the like can be extracted with reference to the DAOF.

FIG. 18A shows an actual page configuration, and FIG. 18B shows a document structure tree of that page. As a result of the process in step 8100, blocks T3, T4, and T5 are determined to form one group V1, blocks T6 and T7 are determined to form one group V2, and these groups are generated as those which belong to an identical layer.

In step 8102, the presence/absence of a vertical separator is determined. Physically, a separator is an object which has a line attribute in the DAOF. Logically, a separator is an element which explicitly divides blocks in an application. Upon detection of a separator, a group is re-divided in the identical layer.

It is then determined in step 8104 using a group length if no more divisions are present. More specifically, it is determined whether the group length in the vertical direction agrees with a page height. If the group length in the vertical direction agrees with the page height (YES in step S8104), the process ends. On the other hand, if the group length in the vertical direction does not agree with the page height (NO in step S8104), the flow advances to step S8106.

The document image in FIG. 18A has no separator, and its group heights do not agree with the page height. Hence, the flow advances to step 8106.

In step 8106, re-grouping is done for respective blocks on the basis of relevance in the horizontal direction. In this process as well, the first determination immediately after the start is done for respective microblocks. The definitions of relevance and its determination information are the same as those in the vertical direction.

In the document image of FIG. 18A, the blocks T1 and T2 generate a group H1, and the groups V1 and V2 generate a group H2. The groups H1 and H2 are generated as those which belong to an identical layer one level higher than the groups V1 and V2.

In step 8108, the presence/absence of a separator in the horizontal direction is determined. Since FIG. 18A includes a separator S1 in the horizontal direction, that separator is registered in a document structure tree, thus generating the layers H1, S1, and H2.

It is determined in step 8110 using a group length in the horizontal direction if no more divisions are present. More specifically, it is determined whether the group length in the horizontal direction agrees with a page width. When the group length in the horizontal direction agrees with the page width (YES in step S8110), the process ends. On the other hand, if the group length in the horizontal direction does not agree with the page width (NO in step S8110), the flow returns to step 8100 to repeat the processes from step S8100 in an upper layer by one level.

In case of FIG. 18A, since the group length in the horizontal direction agrees with the page width, the process ends in step S8110, and an uppermost layer V0 that represents the entire page is finally appended to the document structure tree.

After the document structure tree is completed, application data is generated based on the document structure tree in step 8004 in FIG. 16.

A practical example in case of FIG. 18A will be explained below.

That is, since the group H1 includes the two blocks T1 and T2 in the horizontal direction, it is output as two columns. After internal information of the block T1 (with reference to the DAOF, text as the character recognition result, image, and the like) is output, a new column is set, and internal information of the block T2 is output. After that, the separator S1 is output.

Since the group H2 includes the two blocks V1 and V2 in the horizontal direction, it is output as two columns. Internal information of the block V1 is output in the order of the blocks T3, T4, and T5, and a new column is set. Then, internal information of the block V2 is output in the order of the blocks T6 and T7.

In this manner, the conversion process from DAOF into application data can be done.

[Pointer Information Appending Process]

Details of the process in step S135 in FIG. 3 according to the first embodiment of the present invention will be described with reference to FIG. 19.

Figure 19:
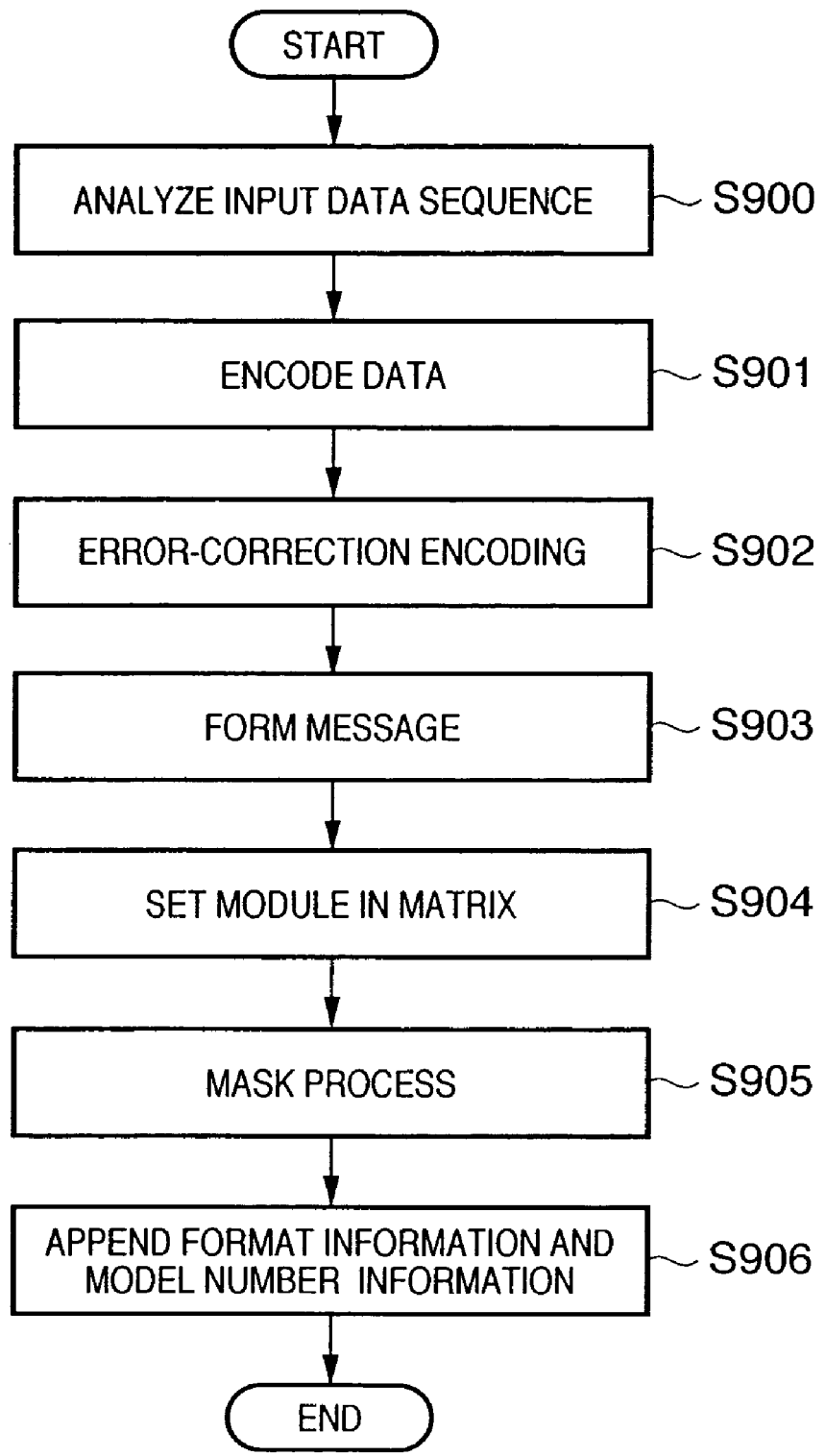
FIG. 19 is a flowchart showing details of a process in step S135 according to the first embodiment of the present invention.

FIG. 19 is a flowchart showing the details of the process in step S135 according to the first embodiment of the present invention.

A process of encoding a data character string as pointer information by a two-dimensional barcode (QR code symbol: JIS X0510) and appending the encoded data to an image will be described with reference to FIG. 19.

Data to be encoded in the two-dimensional barcode represents address information of the corresponding electronic file, which is formed of, e.g., path information including a file server name and file name. Or the address information may be formed of a URL (URI) to the corresponding electronic file, a file ID managed in the database 105 that stores the corresponding electronic file or in the storage unit 111 of the MFP 100 itself, or the like.

In step S900, in order to identify different types of characters to be encoded, an input data sequence is analyzed. Also, error detection and error correction levels are selected, and a minimum model number that can store input data is selected.

In step S901, the input data sequence is converted into a predetermined bit sequence, and an indicator indicating a mode (numeric, alphanumeric, 8-bit byte, kanji, etc.) and an end pattern are appended as needed. Furthermore, the bit sequence is converted into predetermined bit code words.

At this time, for the purpose of error correction, in step S902, the code word sequence is segmented into a predetermined number of blocks in accordance with the model number and error correction level, and error correction code words are generated for respective blocks and are appended after the data code word sequence.

In step S903, the data code words of respective blocks obtained in step 902 are connected, and error correction code words and remainder code words as needed are connected after the data code word sequence.

Next, in step S904, the code word module is set in a matrix together with a position detection pattern, separation pattern, timing pattern, alignment pattern, and the like.

In step S905, a mask pattern optimal to the symbol encoding region is selected to perform a mask process of converting the mask process pattern into the module obtained in step 904 by calculating XORs.

Finally, in step S906, type information and model number information are generated for the module obtained in step 905, thus completing a two-dimensional code symbol.

With the above-mentioned process, for example, when a corresponding electronic file is to be printed as print data from the client PC 102, the two-dimensional barcode that incorporates address information is converted into recordable raster data by the data processor 115, is appended to a predetermined position on raster data of the electronic file, and is printed. By reading printed matter (document) on which the two-dimensional barcode (pointer information) by the image reader 110, the storage location of the original electronic file specified by the pointer information can be detected.

For the same purpose, a method of directly appending pointer information to an electronic file as a character string, and so-called watermarking methods including a method of embedding information by modulating the spacings of a character string in an electronic file (especially, the spacings between neighboring characters), a method of embedding information in a halftone image (thumbnail image) in an electronic file, and the like, can be applied in addition to the two-dimensional barcode.

[Rasterization/Comparison/Selection Process]

The rasterization/comparison/selection process in step S137 will be described next.

In this process, a rasterization process is performed by rasterizing vectorized data obtained in the vectorization process in step S129 onto, e.g., the storage unit 111 and converting the data into raster data.

Figure 20:
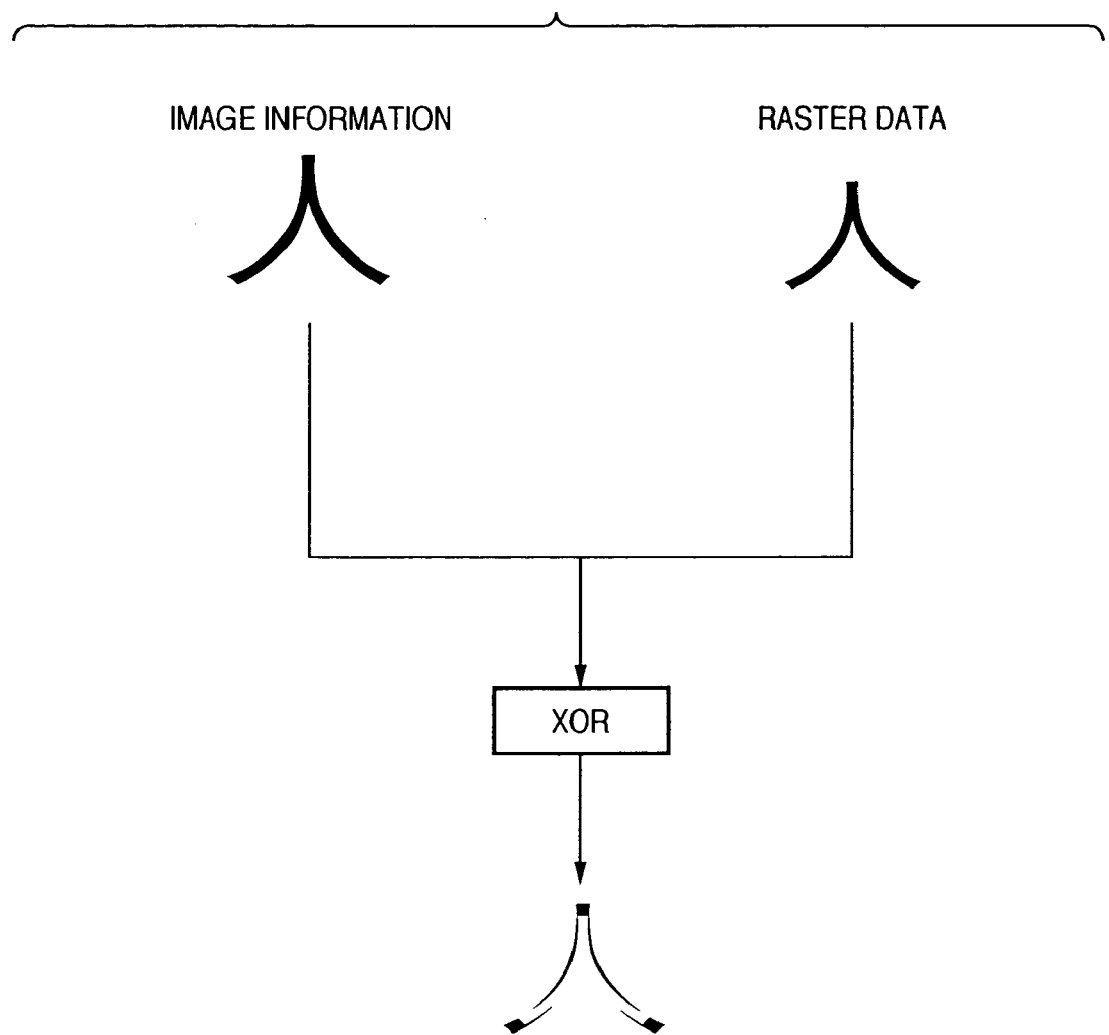
FIG. 20 is a view for explaining the concept of a rasterization/comparison/selection process according to the first embodiment of the present invention.

In a comparison process in this embodiment, as shown in FIG. 20, XORs of image information (first image information) of a scanned document image obtained in step S120 and image information (second image information) having been reconverted from vector data into raster data in the rasterization process are calculated, thereby deriving a difference between the first information and the second information.

In a selection process, either of the image information of the scanned document image obtained in step S120 and the vector data obtained in the vectorization process in step S129 is selected on the basis of the result of the comparison process to register it as an electronic file corresponding to the scanned document image.

As selection methods, there are available the following methods.

(1) If the first image information is different from the second image information, the first image information is selected as the electronic file corresponding to the scanned document image.

(2) If the proportion of the difference between the first image information and the second image information is equal to or less than a threshold value, the vector data corresponding to the second image information is selected.

This selection is automatically performed by the data processor 115. As other selection methods, there are available the following methods.

(3) The result (the first image data and second image data) of the comparison process is presented on the display 116, and the method (1) or (2) is selected in accordance with the user's operation.

(4) For each of kinds of blocks obtained in the block selection process, the method (1) or (2) is selected.

As still other selection methods, there are available the following methods.

(5) In the case of the method (1), if the contents specified by the user's operation indicate image edit, the vector data corresponding to the second image information is selected.

(6) The threshold value in the method (2) is so arranged as to be changed by the user's operation, and the method (2) is selected on the basis of the threshold value set by the user's operation.

Whether the first image information or the vector data corresponding to the second image information is selected as the electronic file may be determined by arbitrarily combining the selection methods (1) to (6) and other selection methods in accordance with the application purpose.

[Application for Electronic File Search]

In this embodiment, a search for an original electronic file (electronic file) corresponding to a scanned document image is made on the basis of pointer information in the scanned document image or object information (attribute information, layout, OCR information, and the like) of each object in the scanned document image. To more accurately search for the original electronic file, the search may be made based on both the pointer information and object information.

More specifically, even when the original electronic file is found using the pointer information in the scanned document image, a search based on the object information in the scanned document image (e.g., a layout search using the layout or a full-text search using the OCR information) is made for the original electronic file found using the pointer information. If the original electronic file is found to have high similarity level, the electronic file is specified as a formal original electronic file.

Assume that the detection precision of the pointer information is poor, and a plurality of candidates for the original electronic file are found. With above-mentioned arrangement, the candidates for the original electronic file are further narrowed down by the search based on the object information, and the original electronic file can be specified. Thus, high-speed and high-precision specifying operation can be implemented.

[Application of Vectorization Process]

In the first embodiment, if an original electronic file or electronic file corresponding to a scanned document image cannot be specified, the vectorization process is performed for the entire scanned document image. In some cases, all objects in a scanned document image to be processed are not newly created, and some of them are diverted from another existing electronic file.

For example, several patterns of background objects (wall papers) are prepared in a word processing application, and one of them is generally selected and used. Such background object is highly likely to be present in an existing electronic file in a file server and is also highly likely to be present as reusable vector data.

For this reason, as another example of the vectorization process in step S129 in FIG. 3, an electronic file containing an object to be processed out of separate objects obtained in the block selection process may be searched for in the file server. If any electronic file is found, vector data may be obtained for each object from the found electronic file.

With this arrangement, the vectorization process need not be performed for the entire scanned document image. This makes it possible to perform the vectorization process at high speed and prevent degradation in image quality due to the vectorization process.

On the other hand, if an electronic file found in the step search process in FIG. 3 is a PDF file, the PDF file may have character codes having undergone character recognition as an additional file for a text object in the PDF file. If the additional file (character code file) is used to perform the vectorization process for the PDF file, the character recognition process to be performed as part of the process in step S129 can be skipped, and the vectorization process can be performed at higher speed.

As described above, according to the first embodiment, the first image information of a scanned document image is compared with the second image information obtained from vector data temporarily generated as an electronic file corresponding to the scanned document image. On the basis of the comparison contents, data (image data or vector data) in a format to be finally used as the electronic file corresponding to the scanned document image is selected, thereby preventing use of an electronic file considerably different from the contents of the scanned document image.

In the vectorization process, vector data corresponding to each object in the scanned document image is searched for. If any vector data is found, the vector data is adopted as one corresponding to the object, thereby implementing a high-precision and high-speed vectorization process.

Second Embodiment

In the second embodiment, a case will be described wherein a vectorization and rasterization/comparison/selection process is performed for each of objects obtained in the block selection process in "Application of Vectorization Process" according to the first embodiment.

The concept of a vectorization and rasterization/comparison/selection process according to the second embodiment will be described with reference to FIG. 21.

Figure 21:
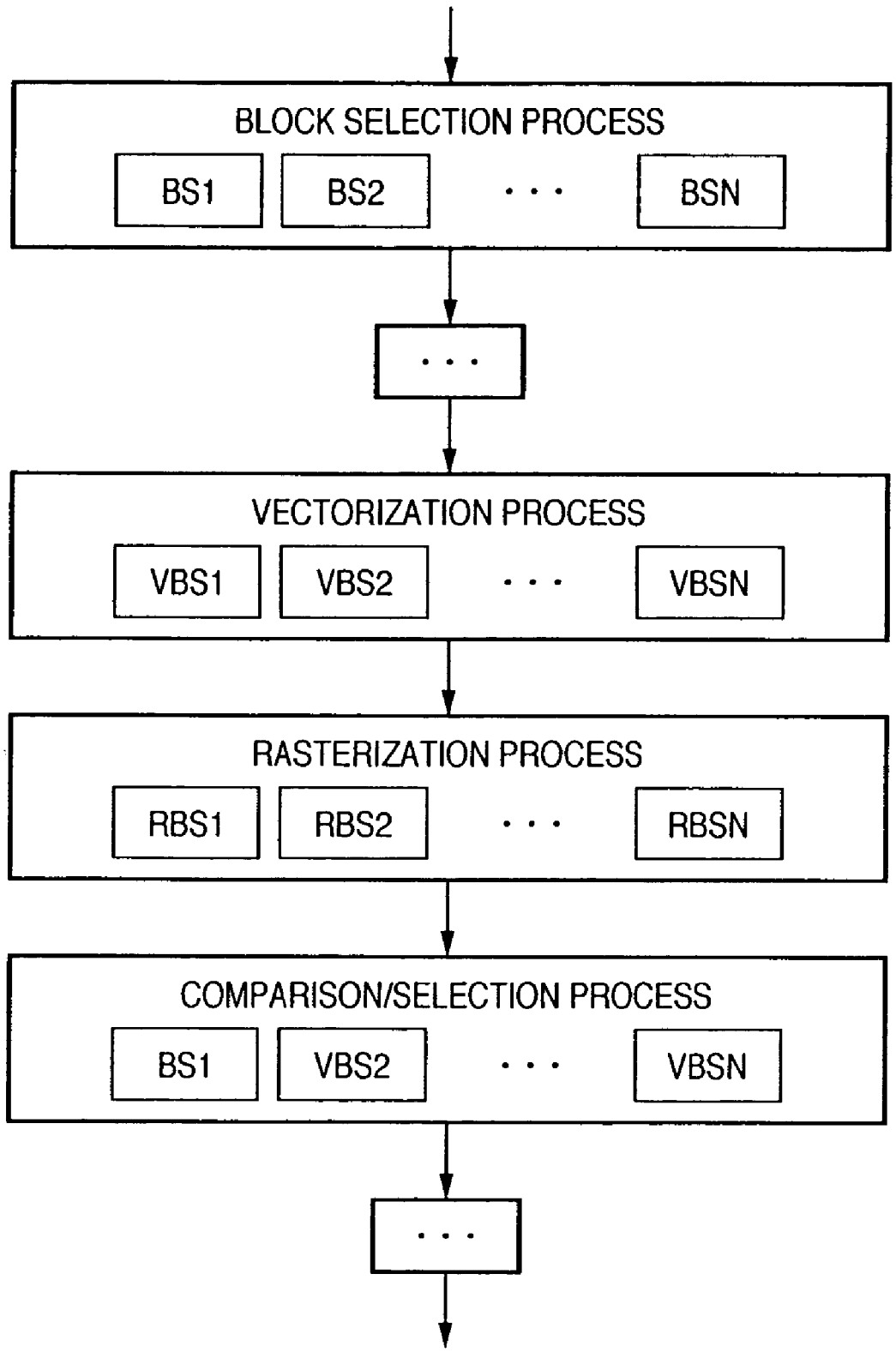
FIG. 21 is a view for explaining the concepts of a vectorization process and rasterization/comparison/selection process according to the second embodiment of the present invention.

FIG. 21 is a view for explaining the concept of the vectorization and rasterization/comparison/selection process according to the second embodiment of the present invention.

Assume that in the second embodiment, blocks BS1, BS2, ..., BSN (N: positive integer) are obtained in the block selection in step S121 in FIG. 3 according to the first embodiment, as shown in FIG. 21. Then, the processes in steps S122 to S128 in FIG. 3 are performed. In a vectorization process in step S129, vectorization is performed for each of the blocks BS1, BS2, ..., BSN, thereby obtaining vector data VBS1, VBS2, ..., VBSN.

In a rasterization process of a rasterization/comparison/selection process in step S137 in FIG. 3, rasterization is performed for each of the vector data VBS1, VBS2, ..., VBSN, thereby obtaining raster data RBS1, RBS2, ..., RBSN.

In a comparison/selection process of the rasterization/comparison/selection process in step S137 in FIG. 3, each of the blocks BS1, BS2, ..., BSN is compared with the corresponding one of the raster data RBS1, RBS2, ..., RBSN. On the basis of the comparison result, either the blocks (images) or the vector data are selected as an object electronic file to be finally selected. In the case of FIG. 21, BS1, VBS2, ..., VBSN are selected.

As described above, according to the second embodiment, the following effect can be obtained in addition to the effect described in the first embodiment. More specifically, an electronic file corresponding to a scanned document image with contents closer to the user's intention can be used by selecting image information or vector data of each object in the scanned document image as an electronic file corresponding to the scanned document image.

Third Embodiment

In the second embodiment, the rasterization/comparison/selection process is performed for each of objects (blocks) obtained in the block selection process. The rasterization/comparison/selection process may be performed on the basis of the attribute of each object (block) obtained in the block selection process.

The concept of a vectorization and rasterization/comparison/selection process according to the third embodiment will be described with reference to FIG. 22.

Figure 22:
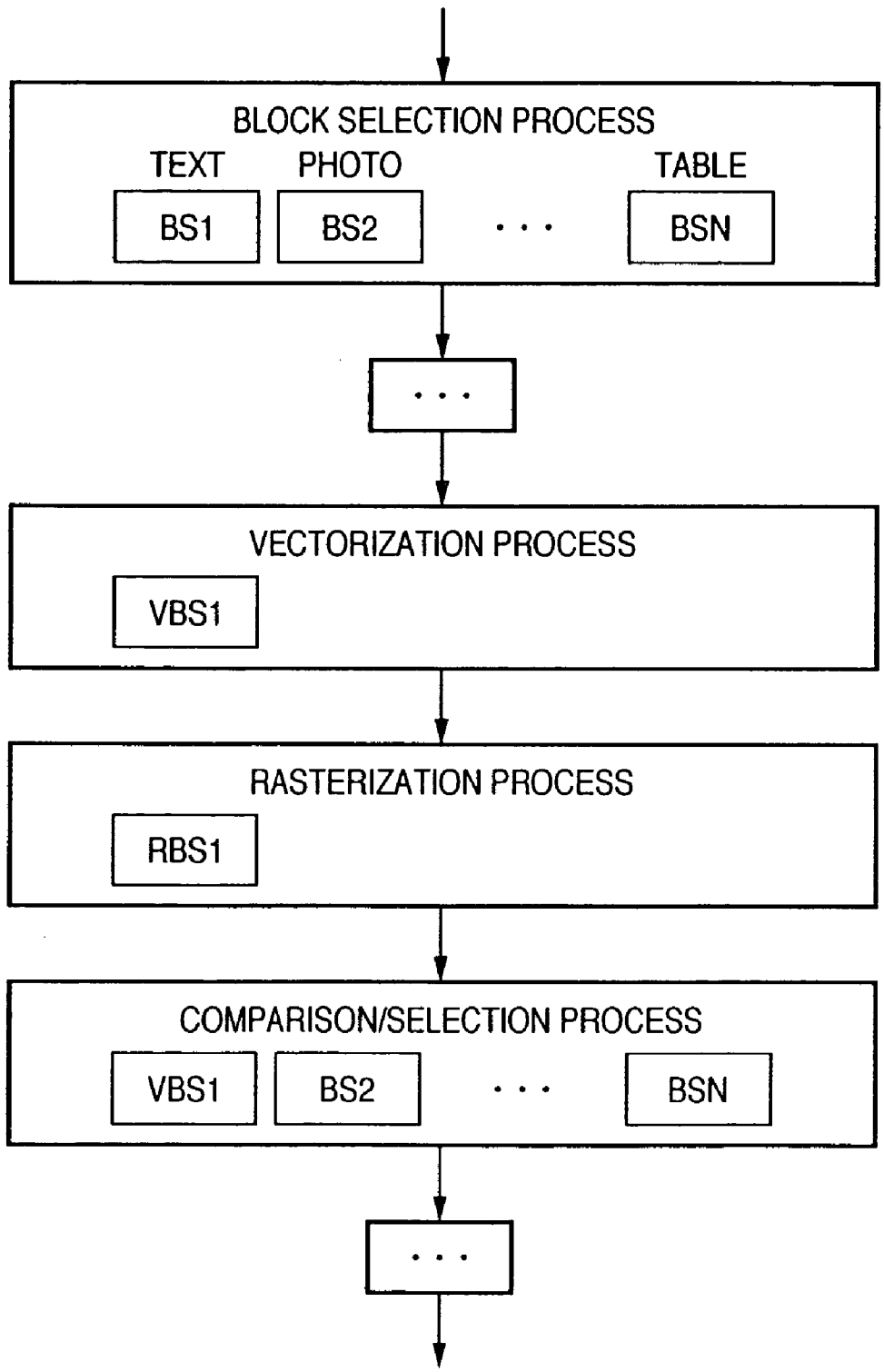
FIG. 22 is a view for explaining the concepts of a vectorization process and rasterization/comparison/selection process according to the third embodiment of the present invention.

FIG. 22 is a view for explaining the concept of the vectorization and rasterization/comparison/selection process according to the third embodiment.

Assume that in the third embodiment, blocks BS1 (attribute: TEXT), BS2 (attribute: PHOTO), ..., BSN (attribute: TABLE) (N: positive integer) are obtained in the block selection in step S121 in FIG. 3 according to the first embodiment, as shown in FIG. 22. Then, the processes in steps S122 to S128 in FIG. 3 are performed. If only objects whose attributes are TEXT are specified as objects to be processed in the vectorization process in step S129, e.g., in the initial settings of the image processing system or by the user's operation, vectorization is performed only for the block BS1, whose attribute is TEXT, thereby obtaining vector data VBS1.

In a rasterization process of a rasterization/comparison/selection process in step S137 in FIG. 3, rasterization is performed only for the vector data VBS1, thereby obtaining raster data RBS1.

In a comparison/selection process of the rasterization/comparison/selection process in step S137 in FIG. 3, the block BS1 is compared with the raster data RBS1. On the basis of the comparison result, either the block (image) or the vector data is selected as an object electronic file to be finally selected.

In the case of FIG. 22, the vector data VBS1 is selected. The blocks BS2 and BSN, which have not undergone the vectorization and rasterization/comparison/selection process and whose attributes are PHOTO and TABLE, respectively, are directly selected.

As described above, according to the third embodiment, the following effect can be obtained in addition to the effect described in the first embodiment. More specifically, whether to perform the vectorization and rasterization/comparison/selection process is specified for each of the attributes of objects in a scanned document image. The vectorization and rasterization/comparison/selection process is performed only for objects with the specified attributes. This makes it possible to efficiently generate and use an electronic file corresponding to a scanned document image with contents closer to the user's intention.

When the rasterization/comparison/selection process is to be performed depending on the attribute of each object, different criteria (allowable threshold values as an electronic file) may be adopted for the respective attributes.

If vectorized data after the rasterization/comparison/selection process does not exceed the allowable threshold value, both vectorized data and image data may be left instead of leaving only image data.

Also, if the vectorized data does not exceed the allowable threshold value, the number of objects to be processed as image may be increased to make it easier to adopt vectorized data by repeating the rasterization/comparison/selection process.

If the rasterization/comparison/selection process is performed after an enlargement process, a difference caused by an error in the vectorization process increases, and data having undergone improper vectorization can be prevented from being left alone.

The above-mentioned process (the rasterization/comparison/selection process, or this process and the process of gradually increasing the number of objects to be processed as image) may be performed automatically or interactively.

The embodiments have been described in detail above. The present invention can take forms of a system, apparatus, method, program, storage medium, and the like. More specifically, the present invention may be applied to a system including a plurality of devices or an apparatus formed by a single device.

The present invention is also achieved by supplying a software program (in the above embodiments, programs corresponding to flowcharts shown in the drawings) for realizing the functions of the above-described embodiments to a system or apparatus directly or from a remote place, and reading out and executing the supplied program codes by the computer of the system or apparatus.

Hence, the present invention is realized by program codes installed in the computer in order to realize the functional processes of the present invention by the computer. That is, the present invention includes a computer program for realizing the functional processes of the present invention.

In this case, the present invention can take any program form such as an object code, a program executed by an interpreter, or script data supplied to an OS as long as a program function is attained.

A recording medium for supplying the program includes a floppy® disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can also be supplied by connecting a client computer to an Internet Web page via the browser of the client computer, and downloading the computer program of the present invention or a compressed file containing an automatic installing function from the Web page to a recording medium such as a hard disk. The program can also be realized by grouping program codes which form the program of the present invention into a plurality of files, and downloading the files from different Web pages. That is, the present invention also includes a WWW server which allows a plurality of users to download the program files for realizing the functional processes of the present invention by a computer.

The program of the present invention can also be encrypted, stored in a storage medium such as a CD-ROM, and distributed to the user. A user who satisfies predetermined conditions is prompted to download decryption key information from a Web page via the Internet. The user executes the encrypted program by using the key information, and installs the program in the computer.

The functions of the above-described embodiments are realized when the computer executes the readout program. Also, the functions of the above-described embodiment are realized when an OS or the like running on the computer performs some or all of, actual processes on the basis of the instructions of the program.

The functions of the above-described embodiments are also realized when the program read out from the storage medium are written in the memory of a function expansion board inserted into the computer or the memory of a function expansion unit connected to the computer, and then the CPU of the function expansion board or function expansion unit performs some or all of actual processes on the basis of the instructions of the program.

The present invention is not limited to the above embodiments and various changes and modifications can be made within the spirit and scope of the present invention. Therefore, to appraise the public of the scope of the present invention, the following claims are made.

CLAIM OF PRIORITY

This application claims priority from Japanese Patent Application No. 2003-390750 filed on Nov. 20, 2003, the entire contents of which are hereby incorporated by reference herein.

What is claimed is:

1. An image processing apparatus which performs image processing for an original image obtained by reading an original, comprising:
a reading unit, adapted to read an original;
a first conversion unit, adapted to convert an original image read by said reading unit into vector data;
a second conversion unit, adapted to convert the vector data into image data;
a comparison unit, adapted to compare first image data of the original image with second image data generated by said second conversion unit; and
a selection unit, adapted to select the first image data or vector data as an electronic file corresponding to the original image on the basis of a comparison result from said comparison unit,
wherein said selection unit selects the first image as the electronic file corresponding to the original image if the comparison result from said comparison unit shows that the first image data is different from the second image data.

2. The apparatus according to claim 1, further comprising a specifying unit, adapted to specify the electronic file corresponding to the original image on the basis of the original image read by said reading unit,
wherein said first conversion unit converts the original image into vector data if said specifying unit cannot specify the electronic file corresponding to the original image.

3. The apparatus according to claim 1, wherein said selection unit selects the second image as the electronic file corresponding to the original image if the comparison result from said comparison unit shows that a proportion of a difference between the first image data and the second image data is equal to or less than a threshold value.

4. The apparatus according to claim 1, further comprising:
a presentation unit, adapted to present the first image data and second image data on a display as the comparison result from said comparison unit; and
a designation unit, adapted to designate either of the first image data and the second image data presented on the display,
wherein said selection unit selects the first image data or second image data designated by said designation unit as the electronic file corresponding to the original image.

5. The apparatus according to claim 2, wherein if the electronic file specified by said specifying unit is image data, said first conversion unit converts the image data into vector data.

6. The apparatus according to claim 2, wherein said specifying unit comprises a recognition unit, adapted to recognize pointer information appended to an original image and indicating a storage destination of an electronic file corresponding to the original image and specifies the electronic file corresponding to the original image on the basis of the pointer information recognized by said recognition unit.

7. The apparatus according to claim 2, further comprising:
a search unit, adapted to, if said specifying unit cannot specify the electronic file corresponding to the original image, and said recognition unit cannot recognize the pointer information, search for the electronic file corresponding to the original image in a storage;
an output unit, adapted to output electronic files found by said search unit as candidates for the electronic file corresponding to the original image; and
a selection unit, adapted to select a desired electronic file from the candidates for the electronic file,
wherein if the electronic file selected by said selection unit is image data, said first conversion unit converts the image data into vector data.

8. The apparatus according to claim 1, further comprising division unit, adapted to divide the original image for each attribute into a plurality of blocks,
wherein said first conversion unit converts each of the blocks of the original image obtained by said division unit into vector data.

9. The apparatus according to claim 8, wherein said second conversion unit converts the vector data generated by said first conversion unit for said each block into image data for the block.

10. The apparatus according to claim 9, wherein said comparison unit compares first image data for each of the blocks of the original image obtained by said division unit with second image data generated for the block by said second conversion unit.

11. The apparatus according to claim 1, further comprising data conversion unit, adapted to convert the vector data into data in a predetermined format processable by a word processing application which can operate on a terminal.

12. The apparatus according to claim 1, further comprising:
a storage unit, adapted to store the first image data or vector data selected by said selection unit in a predetermined storage as the electronic file corresponding to the original image; and
an appending unit, adapted to generate pointer information indicating a storage destination of the electronic file and appending the pointer information to the electronic file.

13. The apparatus according to claim 2, further comprising:
- a division unit, adapted to divide the original image for each attribute into a plurality of blocks; and
- a search unit, adapted to, if said specifying unit cannot specify the electronic file corresponding to the original image, search for vector data corresponding to each of the blocks obtained by said division unit in a storage,
- wherein said first conversion unit converts the original image into vector data using vector data found by said search unit.

14. The apparatus according to claim 1, further comprising:
- a division unit, adapted to divide the original image for each attribute into a plurality of blocks; and
- a control unit, adapted to execute said first conversion unit, second conversion unit, comparison unit, and selection unit for each of the blocks obtained by said division unit.

15. The apparatus according to claim 1, further comprising:
- a division unit, adapted to divide the original image for each attribute into a plurality of blocks; and
- a control unit, adapted to execute said first conversion unit, second conversion unit, comparison unit, and selection unit depending on a type of each of the blocks obtained by said division unit.

16. A control method for an image processing apparatus which performs image processing for an original image obtained by reading an original, comprising:
- a read step of reading an original;
- a first conversion step of converting an original image read in the read step into vector data;
- a second conversion step of converting the vector data into image data;
- a comparison step of comparing first image data of the original image with second image data generated in the second conversion step; and
- a selection step of selecting the first image data or vector data as an electronic file corresponding to the original image on the basis of a comparison result from the comparison step,
- wherein said selection step selects the first image as the electronic file corresponding to the original image if the comparison result from said comparison step shows that the first image data is different from the second image data.

* * * * *